(12) United States Patent
Lai et al.

(10) Patent No.: US 9,964,735 B2
(45) Date of Patent: May 8, 2018

(54) OPTICAL IMAGE CAPTURING SYSTEM

(71) Applicant: ABILITY OPTO-ELECTRONICS TECHNOLOGY CO. LTD., Taichung (TW)

(72) Inventors: Chien-Hsun Lai, Taichung (TW); Nai-Yuan Tang, Taichung (TW); Yao-Wei Liu, Taichung (TW); Yeong-Ming Chang, Taichung (TW)

(73) Assignee: Ability Opto-Electronics Technology Co., Ltd., Taichung (TW)

( * ) Notice: Subject to any disclaimer, the term of this patent is extended or adjusted under 35 U.S.C. 154(b) by 0 days. days.

(21) Appl. No.: 15/292,551

(22) Filed: Oct. 13, 2016

(65) Prior Publication Data

US 2017/0307844 A1   Oct. 26, 2017

(30) Foreign Application Priority Data

Apr. 22, 2016 (TW) .............................. 105112668 A

(51) Int. Cl.
| | |
|---|---|
| G02B 13/18 | (2006.01) |
| G02B 9/00 | (2006.01) |
| G02B 9/34 | (2006.01) |
| G02B 13/00 | (2006.01) |
| G02B 27/00 | (2006.01) |
| G02B 5/20 | (2006.01) |
| G02B 7/04 | (2006.01) |
| G02B 27/64 | (2006.01) |

(Continued)

(52) U.S. Cl.
CPC .............. *G02B 13/004* (2013.01); *G02B 5/20* (2013.01); *G02B 5/208* (2013.01); *G02B 7/04* (2013.01); *G02B 9/34* (2013.01); *G02B 27/0025* (2013.01); *G02B 27/646* (2013.01); *G02B 5/005* (2013.01); *G02B 7/022* (2013.01); *G02B 7/023* (2013.01)

(58) Field of Classification Search
CPC ........ G02B 13/004; G02B 9/34; G02B 7/023; G02B 7/022; G02B 7/04; G02B 5/005; G02B 27/0025; G02B 5/208; G02B 5/20; G02B 27/646
USPC ........ 359/715, 739, 771–783, 811, 819, 821, 359/822, 823, 827, 829
See application file for complete search history.

(56) References Cited

U.S. PATENT DOCUMENTS

| | | | | |
|---|---|---|---|---|
| 9,632,286 | B2 * | 4/2017 | Liu ...................... | G02B 13/004 |
| 2016/0306137 | A1 * | 10/2016 | Lee ...................... | G02B 13/004 |
| 2016/0306138 | A1 * | 10/2016 | Lee ...................... | G02B 13/004 |

(Continued)

FOREIGN PATENT DOCUMENTS

| | | |
|---|---|---|
| TW | 201232090 A | 8/2012 |
| TW | 201329494 A | 7/2013 |

(Continued)

*Primary Examiner* — Evelyn A Lester
(74) *Attorney, Agent, or Firm* — Muncy, Geissler, Olds & Lowe, P.C.

(57) ABSTRACT

An optical image capturing system is provided. In the order from an object side to an image side, the optical image capturing system includes a first lens with positive refractive power; a second lens with refractive power; a third lens with refractive power; and a fourth lens with refractive power; and at least one of the image-side surface and object-side surface of each of the four lens elements is aspheric. The optical lens can increase aperture value and improve the imagining quality for use in compact cameras.

25 Claims, 24 Drawing Sheets

(51) Int. Cl.
*G02B 5/00* (2006.01)
*G02B 7/02* (2006.01)

(56) References Cited

U.S. PATENT DOCUMENTS

2016/0334601 A1* 11/2016 Liu ..................... G02B 13/004
2016/0334602 A1* 11/2016 Liu ..................... G02B 13/004
2016/0356987 A1* 12/2016 Liu ..................... G02B 13/004
2016/0356988 A1* 12/2016 Liu ..................... G02B 13/004

FOREIGN PATENT DOCUMENTS

| TW | 201409065 A | 3/2014 |
| TW | 201418818 A | 5/2014 |
| TW | 105205745 | 4/2016 |

* cited by examiner

OPTICAL IMAGE CAPTURING SYSTEM

CROSS-REFERENCE TO RELATED APPLICATION

This application claims the benefit of Taiwan Patent Application No. 105112668, filed on Apr. 22, 2016, in the Taiwan Intellectual Property Office, the disclosure of which is incorporated herein in its entirety by reference.

BACKGROUND OF THE INVENTION

1. Field of the Invention

The present disclosure relates to an optical image capturing system, and more particularly to a compact optical image capturing system which can be applied to electronic products.

2. Description of the Related Art

In recent years, with the rise of portable electronic devices having camera functionalities, the demand for an optical image capturing system is raised gradually. The image sensing device of ordinary photographing camera is commonly selected from charge coupled device (CCD) or complementary metal-oxide semiconductor sensor (CMOS Sensor). In addition, as advanced semiconductor manufacturing technology enables the minimization of pixel size of the image sensing device, the development of the optical image capturing system directs towards the field of high pixels. Therefore, the requirement for high imaging quality is rapidly raised.

The traditional optical image capturing system of a portable electronic device comes with different designs, including a second-lens or a third-lens design. However, the requirement for the higher pixels and the requirement for a large aperture of an end user, like functionalities of micro filming and night view, or the requirement of wide angle of view of the portable electronic device have been raised. But the optical image capturing system with the large aperture design often produces more aberration resulting in the deterioration of quality in peripheral image formation and difficulties of manufacturing, and the optical image capturing system with wide angle of view design increases distortion rate in image formation, thus the optical image capturing system in prior arts cannot meet the requirement of the higher order camera lens module.

Therefore, how to design an optical image capturing system capable of balancing the requirement for higher total pixel count and quality of the formed image as well as the minimization of camera module by effectively increasing the amount of admitted light and the angle of view the optical image capturing system has become a pressing issue.

SUMMARY OF THE INVENTION

The aspect of embodiment of the present disclosure directs to an optical image capturing system and an optical image capturing lens which use combination of refractive powers, convex and concave surfaces of four-piece optical lenses (the convex or concave surface in the disclosure denotes the geometrical shape of an image-side surface or an object-side surface of each lens on an optical axis) and an embedded mechanism element for positioning the lens element to increase the quantity of incoming light of the optical image capturing system and the angle of view of the optical lenses, and to improve total pixels and imaging quality for image formation, so as to be applied to minimized electronic products.

The terminologies together with their numerals for the structural elements and parameters related to the embodiments of the present invention are given in the following paragraphs for reference in subsequent illustrations:

As shown in FIG. 7, the optical image capturing system may include an image sensing module (not illustrated), the image sensing module includes a substrate and an image sensor on the substrate. The optical image capturing system may further include a lens positioning element 794 which is hollow, in order to accommodate any lens element and to align the lens elements along the optical axis. The lens positioning element is disposed with an object-side end 796 and an image-side end 798. The object-side end 796 is adjacent to the object side and is disposed with a first opening 7962, whereas the image-side end 798 is adjacent to the image side and is disposed with a second opening 7982. The outer wall of the lens positioning element 794 includes two tangent planes 799, each of the tangent planes 799 has a sprue mark 7992. The inner diameter of the aforementioned first opening 7962 is denoted by OD and the inner diameter of the second opening 7982 is denoted by ID, the following condition is satisfied: $0.1 \leq OD/ID < 10$. The minimum thickness of the object-side end 796 is denoted by OT, whereas the minimum thickness of the image-side end 798 is denoted by IT, the following condition is satisfied: $0.1 \leq OT/IT < 10$.

As shown in FIGS. 8A, 8B and 8C, the optical image capturing system may include an image sensing module (not illustrated), the image sensing module includes a substrate and an image sensor on the substrate. The optical image capturing system may further include a lens positioning element 894 which is hollow, in order to accommodate any lens element and align the lens elements along the optical axis. The lens positioning element is disposed with an object-side end 896 and an image-side end 898. The object-side end 896 is adjacent to the object side and is disposed with a first opening 8962, whereas the image-side end 898 is adjacent to the image side and is disposed with a second opening 8982. The outer wall of the lens positioning element 894 includes three tangent planes 899; each of the tangent planes 899 has a sprue mark 8992. The inner diameter of the aforementioned first opening 8962 is denoted by OD and the inner diameter of the second opening 8982 is denoted by ID, the following condition is satisfied: $0.1 \leq OD/ID < 10$. The minimum thickness of the object-side end 896 is denoted by OT, whereas the minimum thickness of the image-side end 898 is denoted by IT, the following condition is satisfied: $0.1 \leq OT/IT < 10$.

The terminologies together with their numerals for the lens elements parameters related to the embodiment of the present invention are given in the following paragraphs for reference in subsequent illustrations:

The Lens Element Parameter Related to the Length or Height of the Lens Element

A height for image formation of the optical image capturing system is denoted by HOI. A height of the optical image capturing system is denoted by HOS. A distance from the object-side surface of the first lens element to the image-side surface of the fourth lens element is denoted by InTL. A distance from the image-side surface of the fourth lens element to an image plane is denoted by InB, where InTL+InB=HOS. A distance from an aperture stop (aperture) to an image plane is denoted by InS. A distance from the first lens element to the second lens element is denoted by In12

(example). A central thickness of the first lens element of the optical image capturing system on the optical axis is denoted by TP1 (example).

The Lens Element Parameter Related to the Material in the Lens Element

An Abbe number of the first lens element in the optical image capturing system is denoted by NA1 (example). A refractive index of the first lens element is denoted by Nd1 (example).

The Lens Element Parameter Related to the Angle of View of the Lens Element

A angle of view is denoted by AF. Half of the angle of view is denoted by HAF. A major light angle is denoted by MRA.

The Lens Element Parameter Related to Exit/Entrance Pupil in the Lens Element

An entrance pupil diameter of the optical image capturing system is denoted by HEP. A maximum effective half diameter position of any surface of single lens element means the vertical height between the effective half diameter (EHD) and the optical axis where the incident light of the maximum angle of view of the system passes through the farthest edge of the entrance pupil on the EHD of the surface of the lens element. For example, the maximum effective half diameter position of the object-side surface of the first lens element is denoted as EHD11. The maximum effective half diameter position of the image-side of the first lens element is denoted as EHD12. The maximum effective half diameter position of the object-side surface of the second lens element is denoted as EHD21. The maximum half effective half diameter position of the image-side surface of the second lens element is denoted as EHD22. The maximum effective half diameter position of any surfaces of the remaining lens elements of the optical image capturing system can be referred as mentioned above.

The Lens Element Parameter Related to an Arc Length of the Lens Element Shape and an Outline of Surface A length of the maximum effective half diameter outline curve at any surface of a single lens element refers to an arc length of a curve, wherein the curve starts from an axial point on the surface of the lens element, travels along the surface outline of the lens element, and ends at the point which defines the maximum effective half diameter; and this arc length is denoted as ARS. For example, the length of the maximum effective half diameter outline curve of the object-side surface of the first lens element is denoted as ARS11. The length of the maximum effective half diameter outline curve of the image-side surface of the first lens element is denoted as ARS12. The length of the maximum effective half diameter outline curve of the object-side surface of the second lens element is denoted as ARS21. The length of the maximum effective half diameter outline curve of the image-side surface of the second lens element is denoted as ARS22. The lengths of the maximum effective half diameter outline curve of any surface of other lens elements in the optical image capturing system are denoted in the similar way.

A length of ½ entrance pupil diameter (HEP) outline curve of any surface of a single lens element refers to an arc length of curve, wherein the curve starts from an axial point on the surface of the lens element, travels along the surface outline of the lens element, and ends at a coordinate point on the surface where the vertical height from the optical axis to the coordinate point is equivalent to ½ entrance pupil diameter; and the arc length is denoted as ARE. For example, the length of the ½ entrance pupil diameter (HEP) outline curve of the object-side surface of the first lens element is denoted as ARE11. The length of the ½ entrance pupil diameter (HEP) outline curve of the image-side surface of the first lens element is denoted as ARE12. The length of the ½ entrance pupil diameter (HEP) outline curve of the object-side surface of the second lens element is denoted as ARE21. The length of the ½ entrance pupil diameter (HEP) outline curve of the image-side surface of the second lens element is denoted as ARE22. The lengths of the ½ entrance pupil diameter (HEP) outline curve of any surface of the other lens elements in the optical image capturing system are denoted in the similar way.

The Lens Element Parameter Related to a Depth of the Lens Element Shape

A distance paralleling an optical axis from a maximum effective half diameter position to an axial point on the object-side surface of the fourth lens element is denoted by InRS41 (example). A distance paralleling an optical axis from a maximum effective half diameter position to an axial point on the image-side surface of the fourth lens element is denoted by InRS42 (example).

The Lens Element Parameter Related to the Lens Element Shape

A critical point C is a tangent point on a surface of a specific lens element, and the tangent point is tangent to a plane perpendicular to the optical axis and the tangent point cannot be the axial point of the lens element surface. Furthermore, a perpendicular distance between a critical point C31 on the object-side surface of the third lens element and the optical axis is HVT31 (example). A perpendicular distance between a critical point C32 on the image-side surface of the third lens element and the optical axis is HVT32 (example). A perpendicular distance between a critical point C41 on the object-side surface of the fourth lens element and the optical axis is HVT41 (example). A perpendicular distance between a critical point C42 on the image-side surface of the fourth lens element and the optical axis is HVT42 (example). The perpendicular distances between the critical point on the image-side surface or object-side surface of other lens elements are denoted in similar fashion.

The object-side surface of the fourth lens element has one inflection point IF411 which is nearest to the optical axis, and the sinkage value of the inflection point IF411 is denoted by SGI411 (example). SGI411 is a horizontal shift distance in parallel with the optical axis from an axial point on the object-side surface of the fourth lens element to the inflection point which is nearest to the optical axis on the object-side surface of the fourth lens element. A distance perpendicular to the optical axis between the inflection point IF411 and the optical axis is HIF411 (example). The image-side surface of the fourth lens element has one inflection point IF421 which is nearest to the optical axis and the sinkage value of the inflection point IF421 is denoted by SGI421 (example). SGI421 is a horizontal shift distance in parallel with the optical axis from an axial point on the image-side surface of the fourth lens element to the inflection point which is nearest to the optical axis on the image-side surface of the fourth lens element. A distance perpendicular to the optical axis between the inflection point IF421 and the optical axis is HIF421 (example).

The object-side surface of the fourth lens element has one inflection point IF412 which is the second nearest to the optical axis and the sinkage value of the inflection point IF412 is denoted by SGI412 (example). SGI412 is a horizontal shift distance in parallel with the optical axis from an axial point on the object-side surface of the fourth lens element to the inflection point which is the second nearest to the optical axis on the object-side surface of the fourth lens element. A distance perpendicular to the optical axis between the inflection point IF412 and the optical axis is HIF412 (example). The image-side surface of the fourth lens element has one inflection point IF422 which is the second nearest to the optical axis and the sinkage value of the inflection point IF422 is denoted by SGI422 (example). SGI422 is a horizontal shift distance in parallel with the optical axis from an axial point on the image-side surface of the fourth lens element to the inflection point which is the second nearest to the optical axis on the image-side surface of the fourth lens element. A distance perpendicular to the optical axis between the inflection point IF422 and the optical axis is HIF422 (example).

The object-side surface of the fourth lens element has one inflection point IF413 which is the third nearest to the optical axis and the sinkage value of the inflection point IF413 is denoted by SGI413 (example). SGI413 is a horizontal shift distance in parallel with the optical axis from an axial point on the object-side surface of the fourth lens element to the inflection point which is the third nearest to the optical axis on the object-side surface of the fourth lens element. A distance perpendicular to the optical axis between the inflection point IF413 and the optical axis is HIF413 (example). The image-side surface of the fourth lens element has one inflection point IF423 which is the third nearest to the optical axis and the sinkage value of the inflection point IF423 is denoted by SGI423 (example). SGI423 is a horizontal shift distance in parallel with the optical axis from an axial point on the image-side surface of the fourth lens element to the inflection point which is the third nearest to the optical axis on the image-side surface of the fourth lens element. A distance perpendicular to the optical axis between the inflection point IF423 and the optical axis is HIF423 (example).

The object-side surface of the fourth lens element has one inflection point IF414 which is the fourth nearest to the optical axis and the sinkage value of the inflection point IF414 is denoted by SGI414 (example). SGI414 is a horizontal shift distance in parallel with the optical axis from an axial point on the object-side surface of the fourth lens element to the inflection point which is the fourth nearest to the optical axis on the object-side surface of the fourth lens element. A distance perpendicular to the optical axis between the inflection point IF414 and the optical axis is HIF414 (example). The image-side surface of the fourth lens element has one inflection point IF424 which is the fourth nearest to the optical axis and the sinkage value of the inflection point IF424 is denoted by SGI424 (example). SGI424 is a horizontal shift distance in parallel with the optical axis from an axial point on the image-side surface of the fourth lens element to the inflection point which is the fourth nearest to the optical axis on the image-side surface of the fourth lens element. A distance perpendicular to the optical axis between the inflection point IF424 and the optical axis is HIF424 (example).

The inflection points on the object-side surface or the image-side surface of the other lens elements and the perpendicular distances between them and the optical axis, or the sinkage values thereof are denoted in the similar way described above.

The Lens Element Parameter Related to the Aberration

Optical distortion for image formation in the optical image capturing system is denoted by ODT. TV distortion for image formation in the optical image capturing system is denoted by TDT. Furthermore, the range of the aberration offset for the view of image formation may be limited to 50%-100%. An offset of the spherical aberration is denoted by DFS. An offset of the coma aberration is denoted by DFC.

The transverse aberration of the edge of the aperture is defined as STOP Transverse Aberration (STA), which assesses the specific performance of the optical image capturing system. The tangential fan or sagittal fan may be applied to calculate the STA of any fields of view, and in particular, to calculate the STAs of the longest operation wavelength (e.g. 650 nm) and the shortest operation wavelength (e.g. 470 nm), which serve as the standard of the performance. The aforementioned direction of the tangential fan can be further defined as the positive (overhead-light) and negative (lower-light) directions. The STA of the max operation wavelength is defined as the distance between the position of the image formed when the max operation wavelength passing through the edge of the aperture strikes a specific field of view of the image plane and the image position of the reference primary wavelength (e.g. wavelength of 555 nm) on specific field of view of the image plane. Whereas the STA of the shortest operation wavelength is defined as the distance between the position of the image formed when the shortest operation wavelength passing through the edge of the aperture strikes a specific field of view of the image plane and the image position of the reference primary wavelength on a specific field of view of the image plane. The criteria for the optical image capturing system to be qualified as having excellent performance may be set as: both STA of the incident longest operation wavelength and the STA of the incident shortest operation wavelength at 70% of the field of view of the image plane (i.e. 0.7 HOI) have to be less than 100 μm or even less than 80 μm.

The optical image capturing system has a maximum image height HOI on the image plane perpendicular to the optical axis. A transverse aberration of the longest operation wavelength of visible light of a positive direction tangential fan of the optical image capturing system passing through an edge of the entrance pupil and incident at the position of 0.7 HOI on the image plane is denoted as PLTA. A transverse aberration of the shortest operation wavelength of visible light of the positive direction tangential fan of the optical image capturing system passing through the edge of the entrance pupil and incident at the position of 0.7 HOI on the image plane is denoted as PSTA. A transverse aberration of the longest operation wavelength of visible light of a negative direction tangential fan of the optical image capturing system passing through the edge of the entrance pupil and incident at the position of 0.7 HOI on the image plane is denoted as NLTA. A transverse aberration of the shortest operation wavelength of visible light of a negative direction tangential fan of the optical image capturing system passing through the edge of the entrance pupil and incident at the position of 0.7 HOI on the image plane is denoted as NSTA. A transverse aberration of the longest operation wavelength of visible light of a sagittal fan of the optical image capturing system passing through the edge of the entrance pupil and incident at the position of 0.7 HOI on the image plane denoted as SLTA. A transverse aberration of the shortest operation wavelength of visible light of the sagittal fan of the optical image capturing system passing through the edge of the entrance pupil and incident at the position of 0.7 HOI on the image plane is denoted as SSTA.

The disclosure provides an optical image capturing system. An object-side surface or an image-side surface of the fourth lens element thereof may have inflection points, such that the incident angle from each field of view to the fourth lens element can be adjusted effectively and the optical distortion and the TV distortion can be corrected as well. Besides, the surfaces of the fourth lens element may have a better optical path adjusting ability to acquire better imaging quality.

The disclosure provides an optical image capturing system, in the order from an object side to an image side, including a first, second, third, and fourth lens elements, a lens positioning element and an image plane. The lens positioning element is hollow to accommodate any lens elements and align the lens elements along the optical axis. The lens positioning element includes an object-side end and an image-side end. The object-side end is adjacent to the object side and is disposed with a first opening. The image-side end is adjacent to the image side and is disposed with a second opening. An outer wall of the lens positioning element includes at least two tangent planes which respectively have at least one sprue mark. The first lens element had refractive power. Focal lengths of the first through fourth lens elements are f1, f2, f3 and f4 respectively. A focal length of the optical image capturing system is f. An entrance pupil diameter of the optical image capturing system is HEP. A distance from an object-side surface of the first lens element to the image plane is HOS. The distance on the optical axis from the object-side surface of first lens element to the image-side surface of fourth lens element is denoted by InTL. Half of the maximum viewable angle of the optical image capturing system is denoted by HAF. An outline curve starting from an axial point on any surface of any one of those lens elements, tracing along the outline of the surface, and ending at a coordinate point on the surface that has a vertical height of ½ entrance pupil diameter from the optical axis, has a length denoted by ARE. The following conditions are satisfied: 1.0≤f/HEP≤10, 0 deg≤HAF≤150 deg, and 0.9≤2 (ARE/HEP)≤2.0.

The disclosure provides another optical image capturing system, in the order from an object side to an image side, including a first, second, third, and fourth lens elements, a lens positioning element and an image plane. The lens positioning element is hollow in order to accommodate any lens elements and align the lens elements along the optical axis. The lens positioning element includes an object-side end and an image-side end. The object-side end is adjacent to the object side and has a first opening. The image-side end is adjacent to the image side and has a second opening. An outer wall of the lens positioning element includes at two tangent planes which respectively have at least one sprue mark. The first lens element has refractive power. The first lens element has refractive power. The second lens element has refractive power. The third lens element has refractive power. The fourth lens element has refractive power. At least two lens elements among the first through the fourth lens elements has at least one inflection point on at least one surface thereof. At least one among the second lens element through the fourth lens element has positive refractive power. Focal lengths of the first through fourth lens elements are f1, f2, f3 and f4 respectively. A focal length of the optical image capturing system is f. An entrance pupil diameter of the optical image capturing system is HEP. A distance on the optical axis from an object-side surface of the first lens element to the image plane is HOS. A distance on the optical axis from the object-side surface of the first lens element to the image-side surface of the fourth lens element is InTL. Half of a maximum angle of view of the optical image capturing system is HAF. An outline curve starting from an axial point on any surface of any one of those lens elements, tracing along the outline of the surface, and ending at a coordinate point on the surface that has a vertical height of ½ entrance pupil diameter from the optical axis, has a length denoted by ARE. The following conditions are satisfied: 1.0≤f/HEP≤10, 0° (degree)≤HAF≤150° (deg), and 0.9≤2 (ARE/HEP)≤2.0.

The disclosure provides another optical image capturing system, in the order from an object side to an image side, including a first, second, third, and fourth lens elements, a lens positioning element and an image plane. The lens positioning element is hollow to accommodate any lens elements and align the lens elements on the optical axis. The lens positioning element includes an object-side end and an image-side end. The object-side end is adjacent to the object side and has a first opening. The image-side end is adjacent to the image side and has a second opening. An outer wall of the lens positioning element includes at two tangent planes which respectively have at least one sprue mark. There are four lens elements with refractive power in the optical image capturing system. The first lens element has refractive power. The second lens element has refractive power. The third lens element has refractive power. The fourth lens element has refractive power. Focal lengths of the first through fourth lens elements are f1, f2, f3 and f4, respectively. A focal length of the optical image capturing system is f. An entrance pupil diameter of the optical image capturing system is HEP. A distance from an object-side surface of the first lens element to the image plane is HOS. A distance on the optical axis from the object-side surface of the first lens element to the image-side surface of the fourth lens element is InTL A horizontal distance in parallel with the optical axis from a coordinate point on the object-side surface of the first lens element at height of ½ HEP to the image plane is ETL. Half of a maximum angle of view of the optical image capturing system is HAF. An outline curve starting from an axial point on any surface of any one of those lens elements, tracing along the outline of the surface, ending at a coordinate point on the surface that has a vertical height of ½ entrance pupil diameter from the optical axis has a length denoted by ARE. The following conditions are satisfied: 1.0≤f/HEP≤10, 0° (degree)≤HAF≤150° (deg), and 0.9≤2 (ARE/HEP)≤2.0.

The length of the outline curve of any surface of single lens element within the range of maximum effective half diameter affects the performance in correcting the surface aberration and the optical path difference between the rays in each field of view. The longer outline curve may lead to a better performance in aberration correction, but the difficulty of the production may become higher. Hence, the length of the outline curve (ARS) of any surface of a single lens element within the range of the maximum effective half diameter has to be controlled, and especially, the proportional relationship (ARS/TP) between the length of the outline curve (ARS) of the surface within the range of the maximum effective half diameter and the central thickness (TP) of the lens element to which the surface belongs on the optical axis has to be controlled. For example, the length of the maximum effective half diameter outline curve of the object-side surface of the first lens element is denoted as ARS11, and the central thickness of the first lens element on the optical axis is TP1, and the ratio between both of them is ARS11/TP1. The length of the maximum effective half diameter outline curve of the image-side surface of the first lens element is denoted as ARS12, and the ratio between ARS12 and TP1 is ARS12/TP1. The length of the maximum effective half diameter outline curve of the object-side surface of the second lens element is denoted as ARS21, and the central thickness of the second lens element on the optical axis is TP2, and the ratio between both of them is ARS21/TP2. The length of the maximum effective half diameter outline curve of the image-side surface of the second lens element is denoted as ARS22, and the ratio between ARS22 and TP2 is ARS22/TP2. The proportional relationships between the lengths of the maximum effective half diameter outline curve of any surface of the other lens elements and the central thicknesses of the lens elements to which the surfaces belong on the optical axis (TP) are denoted in the similar way.

The length of ½ entrance pupil diameter outline curve of any surface of a single lens element especially affects the performance of the surface in correcting the aberration in the shared region of each field of view, as well as the performance in correcting the optical path difference among each field of view. The longer outline curve may lead to a better function of aberration correction, but the difficulty in the production may become higher. Hence, the length of ½ entrance pupil diameter outline curve of any surface of a single lens element has to be controlled, and especially, the proportional relationship between the length of ½ entrance pupil diameter outline curve of any surface of a single lens element and the central thickness on the optical axis has to be controlled. For example, the length of the ½ entrance pupil diameter outline curve of the object-side surface of the first lens element is denoted as ARE11, and the central thickness of the first lens element on the optical axis is TP1, and the ratio thereof is ARE11/TP1. The length of the ½ entrance pupil diameter outline curve of the image-side surface of the first lens element is denoted as ARE12, and the central thickness of the first lens element on the optical axis is TP1, and the ratio thereof is ARE12/TP1. The length of the ½ entrance pupil diameter outline curve of the object-side surface of the first lens element is denoted as ARE21, and the central thickness of the second lens element on the optical axis is TP2, and the ratio thereof is ARE21/TP2. The length of the ½ entrance pupil diameter outline curve of the image-side surface of the second lens element is denoted as ARE22, and the central thickness of the second lens element on the optical axis is TP2, and the ratio thereof is ARE22/TP2. The proportional relationship of the remaining lens elements of the optical image capturing system can be computed in similar way.

The optical image capturing system described above may be configured to form the image on the image sensing device which is shorter than 1/1.2 inch in diagonal length. The pixel size of the image sensing device is smaller than 1.4 micrometers (μm). Preferably the pixel size thereof is smaller than 1.12 micrometers (μm). The best pixel size thereof is smaller than 0.9 micrometers (μm). Furthermore, the optical image capturing system is applicable to the image sensing device with aspect ratio of 16:9.

The optical image capturing system described above is applicable to the demand of video recording with above millions or ten millions-pixels (e.g. 4K2K or the so-called UHD and QHD) and leads to a good imaging quality.

The height of optical system (HOS) may be reduced to achieve the minimization of the optical image capturing system when the absolute value of f1 is larger than f6 (|f1|>f4).

When |f2|+|f3|>|f1|+|f4| are satisfied with above relations, at least one of the second through third lens elements may have weak positive refractive power or weak negative refractive power. The weak refractive power indicates that an absolute value of the focal length of a specific lens element is greater than 10. When at least one of the second through third lens elements has the weak positive refractive power, the positive refractive power of the first lens element can be shared, such that the unnecessary aberration will not appear too early. On the contrary, when at least one of the second through third lens elements has the weak negative refractive power, the aberration of the optical image capturing system can be corrected and fine tuned.

The fourth lens element may have positive refractive power and a concave image-side surface. Hereby, the back focal length is reduced for keeping the miniaturization, to miniaturize the lens element effectively. In addition, at least one of the object-side surface and the image-side surface of the sixth lens element may have at least one inflection point, such that the angle of incident with incoming light from an off-axis field of view can be suppressed effectively and the aberration in the off-axis field of view can be corrected further.

BRIEF DESCRIPTION OF THE DRAWINGS

The detailed structure, operating principle and effects of the present disclosure will now be described in more details hereinafter with reference to the accompanying drawings that show various embodiments of the present disclosure as follows.

DETAILED DESCRIPTION OF THE PREFERRED EMBODIMENTS

Figure 1A:
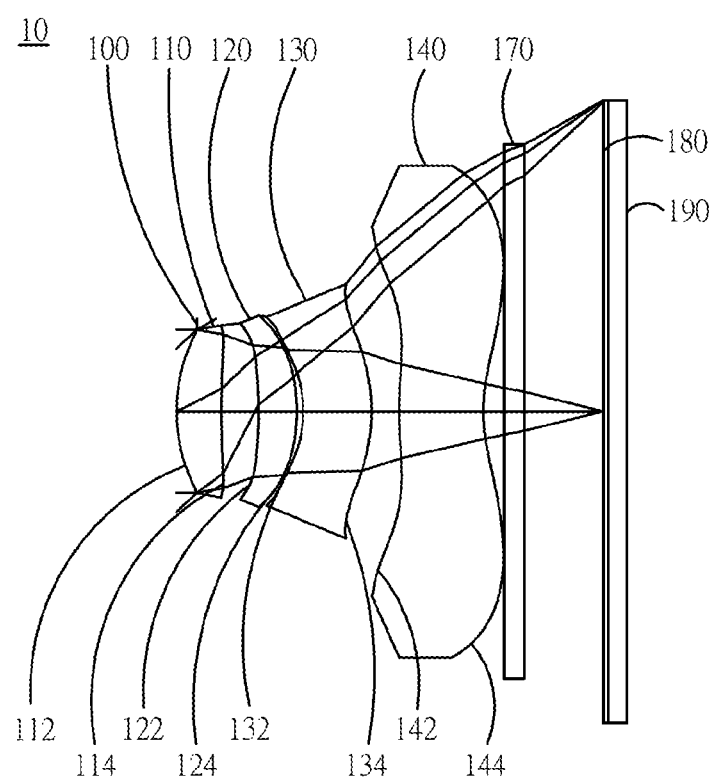
FIG. 1A is a schematic view of the optical image capturing system according to the first embodiment of the present application.

Reference will now be made in detail to the exemplary embodiments of the present disclosure, examples of which are illustrated in the accompanying drawings. Therefore, it is to be understood that the foregoing is illustrative of exemplary embodiments and is not to be construed as limited to the specific embodiments disclosed, and that modifications to the disclosed exemplary embodiments, as well as other exemplary embodiments, are intended to be included within the scope of the appended claims. These embodiments are provided so that this disclosure will be thorough and complete, and will fully convey the inventive concept to those skilled in the art. The relative proportions and ratios of elements in the drawings may be exaggerated or diminished in size for the sake of clarity and convenience in the drawings, and such arbitrary proportions are only illustrative and not limiting in any way. The same reference numbers are used in the drawings and the description to refer to the same or like parts.

It will be understood that, although the terms 'first', 'second', 'third', etc., may be used herein to describe various elements, these elements should not be limited by these terms. The terms are used only for the purpose of distinguishing one component from another component. Thus, a first element discussed below could be termed a second element without departing from the teachings of embodiments. As used herein, the term "or" includes any and all combinations of one or more of the associated listed items.

An optical image capturing system, in order from an object side to an image side, includes a first, second, third, and fourth lens elements with refractive power and an image plane. The optical image capturing system may further include an image sensing device which is disposed on an image plane.

The optical image capturing system may use three sets of operation wavelengths, which are 486.1 nm, 587.5 nm and 656.2 nm, respectively, wherein 587.5 nm is served as the primary reference wavelength and a reference wavelength to obtain technical features of the optical system. The optical image capturing system may also use five sets of wavelengths which are 470 nm, 510 nm, 555 nm, 610 nm and 650 nm, respectively, wherein 555 nm is served as the primary reference wavelength and a reference wavelength to obtain technical features of the optical system.

A ratio of the focal length f of the optical image capturing system to a focal length fp of each of lens elements with positive refractive power is PPR. A ratio of the focal length f of the optical image capturing system to a focal length fn of each of lens elements with negative refractive power is NPR. A sum of the PPR of all lens elements with positive refractive power is ΣPPR. A sum of the NPR of all lens elements with negative refractive powers is ΣNPR. It is beneficial to control the total refractive power and the total length of the optical image capturing system when following conditions are satisfied: 0.5≤ΣPPR/|ΣNPR|≤4.5. Preferably, the following condition may be satisfied: 1≤ΣPPR/|ΣNPR|≤3.5.

The height of the optical image capturing system is HOS. It will facilitate the manufacturing of miniaturized optical image capturing system which may form images with ultra high pixels when the specific ratio value of HOS/f tends to 1.

A sum of a focal length fp of each lens element with positive refractive power is ΣPP. A sum of a focal length fn of each lens element with negative refractive power is $\Sigma NP$. In one embodiment of the optical image capturing system of the present disclosure, the following conditions are satisfied: $0<\Sigma PP\le 200$ and $f1/\Sigma PP\le 0.85$. Preferably, the following conditions may be satisfied: $0<\Sigma PP\le 150$ and $0.01\le f1/\Sigma PP\le 0.7$. As a result, the optical image capturing system will have better control over the focusing, and the positive refractive power of the optical system can be distributed appropriately, so as to suppress any premature formation of noticeable aberration.

The first lens element may have positive refractive power, and it has a convex object-side surface. Hereby, the magnitude of the positive refractive power of the first lens element can be fined-tuned, so as to reduce the total track length of the optical image capturing system.

The second lens element may have negative refractive power. Hereby, the aberration generated by the first lens element can be corrected.

The third lens element may have positive refractive power. Hereby, the positive refractive power of the first lens element can be shared.

The fourth lens element may have negative refractive power and a concave image-side surface. With this configuration, the back focal length is reduced in order to keep the size of the optical system small. In addition, at least one of the object-side surface and the image-side surface of the fourth lens element may have at least one inflection point, which is capable of effectively reducing the incident angle of the off-axis rays of the field of view, thereby further correcting the off-axis aberration. Preferably, each of the object-side surface and the image-side surface may have at least one inflection point.

The optical image capturing system may further include an image sensing device which is disposed on an image plane. Half of a diagonal of an effective detection field of the image sensing device (imaging height or the maximum image height of the optical image capturing system) is HOI. A distance on the optical axis from the object-side surface of the first lens element to the image plane is HOS. The following conditions are satisfied: $HOS/HOI\le 3$ and $0.5\le HOS/f\le 3.0$. Preferably, the following conditions may be satisfied: $1\le HOS/HOI\le 2.5$ and $1\le HOS/f\le 2$. Hereby, the miniaturization of the optical image capturing system can be maintained effectively, so as to be carried by lightweight portable electronic devices.

In addition, in the optical image capturing system of the disclosure, according to different requirements, at least one aperture stop may be arranged for reducing stray light and improving the imaging quality.

In the optical image capturing system of the disclosure, the aperture stop may be a front or middle aperture. The front aperture is the aperture stop between a photographed object and the first lens element. The middle aperture is the aperture stop between the first lens element and the image plane. If the aperture stop is the front aperture, a longer distance between the exit pupil and the image plane of the optical image capturing system can be formed, such that more optical elements can be disposed in the optical image capturing system and the efficiency of the image sensing device in receiving images can be improved. If the aperture stop is the middle aperture, the angle of view of the optical image capturing system can be expended, such that the optical image capturing system has the advantage of a wide-angle lens. A distance from the aperture stop to the image plane is InS. The following condition is satisfied: $0.5\le InS/HOS\le 1.1$. Preferably, the following condition may be satisfied: $0.8\le InS/HOS\le 1$. Hereby, the size of the optical image capturing system can be kept small without sacrificing the feature of wide angle of view.

In the optical image capturing system of the disclosure, a distance from the object-side surface of the first lens element to the image-side surface of the fourth lens element is InTL. A sum of central thicknesses of all lens elements with refractive power on the optical axis is $\Sigma TP$. The following condition is satisfied: $0.45\le \Sigma TP/InTL\le 0.95$. Preferably, the following condition may be satisfied: $0.6\le \Sigma TP/InTL\le 0.9$. Hereby, contrast ratio for the image formation in the optical image capturing system and defect-free rate for manufacturing the lens element can be given consideration simultaneously, and a proper back focal length is provided to dispose other optical components in the optical image capturing system.

A curvature radius of the object-side surface of the first lens element is R1. A curvature radius of the image-side surface of the first lens element is R2. The following condition is satisfied: $0.01\le |R1/R2|\le 0.5$. Hereby, the first lens element may have a suitable magnitude of positive refractive power, so as to prevent the longitudinal spherical aberration from increasing too fast. Preferably, the following condition may be satisfied: $0.01\le |R1/R2|\le 0.4$.

A curvature radius of the object-side surface of the fourth lens element is R9. A curvature radius of the image-side surface of the fourth lens element is R10. The following condition is satisfied: $-200<(R7-R8)/(R7+R8)<30$. This configuration is beneficial to the correction of the astigmatism generated by the optical image capturing system.

A distance between the first lens element and the second lens element on the optical axis is IN12. The following condition is satisfied: $0<IN12/f\le 0.25$. Preferably, the following condition may be satisfied: $0.01\le IN12/f\le 0.20$. Hereby, the chromatic aberration of the lens elements can be mitigated, such that the performance can be increased.

A distance between the second lens element and the third lens element on the optical axis is IN23. The following condition is satisfied: $0<IN23/f\le 0.25$. Preferably, the following condition may be satisfied: $0.01\le IN23/f\le 0.20$. Hereby, the performance of the lens elements can be improved.

A distance between the third lens element and the fourth lens element on the optical axis is IN34. The following condition is satisfied: $0<IN34/f\le 0.25$. Preferably, the following condition may be satisfied: $0.001\le IN34/f\le 0.20$. Hereby, the performance of the lens elements can be improved.

Central thicknesses of the first lens element and the second lens element on the optical axis are TP1 and TP2, respectively. The following condition is satisfied: $1\le (TP1+IN12)/TP2\le 10$. Hereby, the sensitivity produced by the optical image capturing system can be controlled, and the performance can be increased.

Central thicknesses of the third lens element and the fourth lens element on the optical axis are TP3 and TP4, respectively, and a distance between the aforementioned two lens elements on the optical axis is IN34. The following condition is satisfied: $0.2\le (TP4+IN34)/TP4\le 3$. Hereby, the sensitivity produced by the optical image capturing system can be controlled and the total height of the optical image capturing system can be reduced.

A distance between the second lens element and the third lens element on the optical axis is IN23. A total sum of distances from the first lens element to the fourth lens element on the optical axis is $\Sigma TP$. The following condition is satisfied: $0.01\le IN23/(TP2+IN23+TP3)\le 0.5$. Preferably, the following condition may be satisfied: $0.05\le IN23/(TP2+$ IN23+TP3)≤0.4. Hereby, the aberration generated by the process of moving the incident light can be adjusted slightly layer upon layer, and the total height of the optical image capturing system can be reduced.

In the optical image capturing system of the disclosure, a distance in parallel with an optical axis from a maximum effective diameter position to an axial point on the object-side surface 142 of the fourth lens element is InRS41 (InRS41 is positive if the horizontal displacement is toward the image-side surface, or InRS41 is negative if the horizontal displacement is toward the object-side surface). A distance in parallel with an optical axis from a maximum effective diameter position to an axial point on the image-side surface 144 of the fourth lens element is InRS42. A central thickness of the fourth lens element 140 on the optical axis is TP4. The following conditions are satisfied: −1 mm≤InRS41≤1 mm, −1 mm≤InRS42≤1 mm, 1 mm≤|InRS41|+|InRS42|≤2 mm, 0.01≤|InRS41|/TP4≤10 and 0.01≤|InRS42|/TP4≤10. Hereby, the maximum effective diameter position between both surfaces of the fourth lens element can be controlled, so as to facilitate the aberration correction of peripheral field of view of the optical image capturing system and maintain its miniaturization effectively.

In the optical image capturing system of the disclosure, a distance in parallel with an optical axis from an inflection point on the object-side surface of the fourth lens element which is nearest to the optical axis to an axial point on the object-side surface of the fourth lens element is denoted by SGI411. A distance in parallel with an optical axis from an inflection point on the image-side surface of the fourth lens element which is nearest to the optical axis to an axial point on the image-side surface of the fourth lens element is denoted by SGI421. The following conditions are satisfied: 0<SGI411/(SGI411+TP4)≤0.9 and 0<SGI421/(SGI421+TP4)≤0.9. Preferably, the following conditions may be satisfied: 0.01<SGI411/(SGI411+TP4)≤0.7 and 0.01<SGI421/(SGI421+TP4)≤0.7.

A distance in parallel with the optical axis from the inflection point on the object-side surface of the fourth lens element which is the second nearest to the optical axis to an axial point on the object-side surface of the fourth lens element is denoted by SGI412. A distance in parallel with an optical axis from an inflection point on the image-side surface of the fourth lens element which is the second nearest to the optical axis to an axial point on the image-side surface of the fourth lens element is denoted by SGI422. The following conditions are satisfied: 0<SGI412/(SGI412+TP4)≤0.9 and 0<SGI422/(SGI422+TP4)≤0.9. Preferably, the following conditions may be satisfied: 0.1≤SGI412/(SGI412+TP4)≤0.8 and 0.1≤SGI422/(SGI422+TP4)≤0.8.

A distance perpendicular to the optical axis between the inflection point on the object-side surface of the fourth lens element which is nearest to the optical axis and the optical axis is denoted by HIF411. A distance perpendicular to the optical axis between an inflection point on the image-side surface of the fourth lens element which is nearest to the optical axis and an axial point on the image-side surface of the fourth lens element is denoted by HIF421. The following conditions are satisfied: 0.01≤HIF411/HOI≤0.9 and 0.01≤HIF421/HOI≤0.9. Preferably, the following conditions may be satisfied: 0.09≤HIF411/HOI≤0.5 and 0.09≤HIF421/HOI≤0.5.

A distance perpendicular to the optical axis between the inflection point on the object-side surface of the fourth lens element which is the second nearest to the optical axis and the optical axis is denoted by HIF412. A distance perpendicular to the optical axis between an axial point on the image-side surface of the fourth lens element and an inflection point on the image-side surface of the fourth lens element which is the second nearest to the optical axis is denoted by HIF422. The following conditions are satisfied: 0.01≤HIF412/HOI≤0.9 and 0.01≤HIF422/HOI≤0.9. Preferably, the following conditions may be satisfied: 0.09≤HIF412/HOI≤0.8 and 0.09≤HIF422/HOI≤0.8.

A distance perpendicular to the optical axis between the inflection point on the object-side surface of the fourth lens element which is the third nearest to the optical axis and the optical axis is denoted by HIF413. A distance perpendicular to the optical axis between an axial point on the image-side surface of the fourth lens element and an inflection point on the image-side surface of the fourth lens element which is the third nearest to the optical axis is denoted by HIF423. The following conditions are satisfied: 0.001 mm≤|HIF413|≤5 mm and 0.001 mm≤|HIF423|≤5 mm. Preferably, the following conditions may be satisfied: 0.1 mm≤|HIF423|≤3.5 mm and 0.1 mm≤|HIF413|≤3.5 mm.

A distance perpendicular to the optical axis between the inflection point on the object-side surface of the fourth lens element which is the fourth nearest to the optical axis and the optical axis is denoted by HIF414. A distance perpendicular to the optical axis between an axial point on the image-side surface of the fourth lens element and an inflection point on the image-side surface of the fourth lens element which is the fourth nearest to the optical axis is denoted by HIF424. The following conditions are satisfied: 0.001 mm≤|HIF414|≤5 mm and 0.001 mm≤|HIF424|≤5 mm. Preferably, the following conditions may be satisfied: 0.1 mm≤|HIF424|≤3.5 mm and 0.1 mm≤|HIF414|≤3.5 mm.

In one embodiment of the optical image capturing system of the present disclosure, the chromatic aberration of the optical image capturing system can be corrected by alternatively arranging the lens elements with large Abbe number and small Abbe number.

The above Aspheric formula is:

$$z = ch^2/[1+[1-(k+1)c^2h^2]^{0.5}] + A_4h^4 + A_6h^6 + A_8h^8 + A_{10}h^{10} + A_{12}h^{12} + A_{14}h^{14} + A_{16}h^{16} + A_{18}h^{18} + A_{20}h^{20} + \quad (1),$$

where z is a position value of the position along the optical axis and at the height h which reference to the surface apex; k is the conic coefficient, c is the reciprocal of curvature radius, and $A_4$, $A_6$, $A_5$, $A_{10}$, $A_{12}$, $A_{14}$, $A_{16}$, $A_{18}$, and $A_{20}$ are high order aspheric coefficients.

The optical image capturing system provided by the disclosure, the lens elements may be made of glass or plastic material. If plastic material is adopted to produce the lens elements, the cost of manufacturing will be lowered effectively. If lens elements are made of glass, the heat effect can be controlled and the designed space arranged for the refractive power of the optical image capturing system can be increased. Besides, the object-side surface and the image-side surface of the first through fourth lens elements may be aspheric, so as to obtain more control variables. Comparing with the usage of traditional lens element made by glass, the number of lens elements used can be reduced and the aberration can be eliminated. Thus, the total height of the optical image capturing system can be reduced effectively.

In addition, in the optical image capturing system provided by the disclosure, if the lens element has a convex surface, the surface of the lens element is convex adjacent to the optical axis. If the lens element has a concave surface, the surface of the lens element is concave adjacent to the optical axis.

Besides, in the optical image capturing system of the disclosure, according to different requirements, at least one aperture may be arranged for reducing stray light and improving the imaging quality.

The optical image capturing system of the disclosure can be adapted to the optical image capturing system with automatic focus if required. With the features of a good aberration correction and a high quality of image formation, the optical image capturing system can be used in various application fields.

The optical image capturing system of the disclosure can include a driving module according to the actual requirements. The driving module may be coupled with the lens elements to enable the lens elements producing displacement. The driving module described above may be the voice coil motor (VCM) which is applied to move the lens to focus, or may be the optical image stabilization (OIS) which is applied to reduce the distortion frequency owing to the vibration of the lens while shooting.

At least one lens element among the first lens element, the second lens element, the third lens element and the fourth lens element of the optical image capturing system of the present disclosure may be a filter element of light with the wavelength of less than 500 nm, according to the actual requirements. The filter element may be made by the coating on at least one surface of the lens element with the specific filtration function or the lens element itself is designed with the material which is able to filter the short wavelength.

The image plane of the present invention may be a plano or a curved surface based on requirement. When the image plane is a curved surface (such as a spherical surface with a curvature radius), it reduces the incident angle the image plane needs to focus light. In addition to achieving reducing the length of the system, it also promotes the relative illumination.

One aspect of the present invention is to provide a plastic lens positioning element. The plastic lens positioning element may be formed integrally, and may be used for accommodating and positioning the lens elements of the present invention. The outer wall of the lens positioning element may further include at least two sprue marks. Those sprue marks may be symmetrically disposed around an axis (e.g. the optical axis), such that the thickness configuration of the plastic lens positioning element is more uniform, and the structural strength thereof is improved. When the outer wall of the plastic lens positioning element is disposed with two sprue marks, the angles between the sprue marks may be 180 degrees. When the outer wall of the plastic lens positioning element is disposed with three sprue marks, the angles between the sprue marks may be 120 degrees. The aforementioned sprue marks may be disposed at the outer wall of the object-side end or the outer wall of the image-side end.

According to the above embodiments, the specific embodiments with figures are presented in detail as below.

The First Embodiment (Embodiment 1)

Figure 1B:
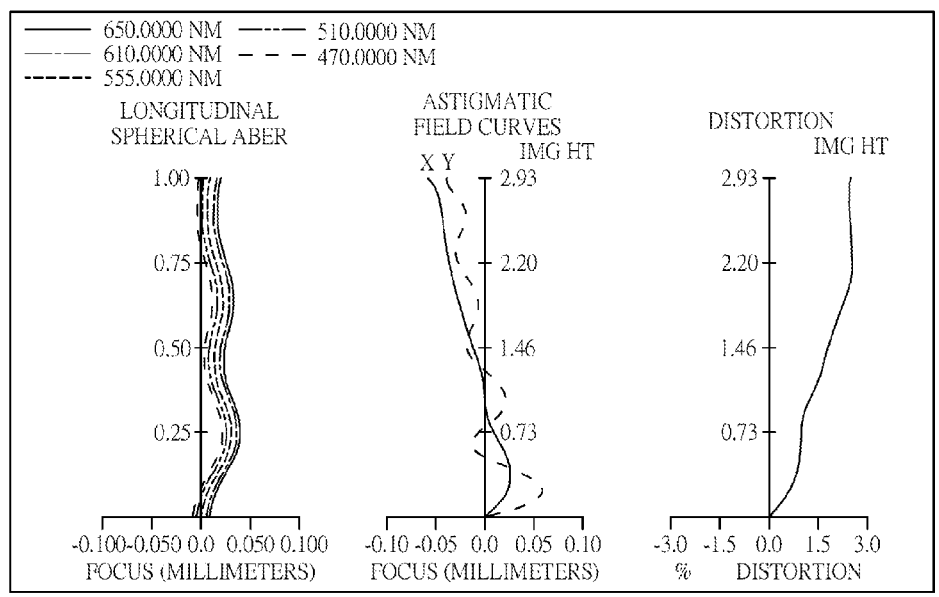
FIG. 1B is longitudinal spherical aberration curves, astigmatic field curves, and an optical distortion curve of the optical image capturing system in the order from left to right according to the first embodiment of the present application.
Figure 1C:
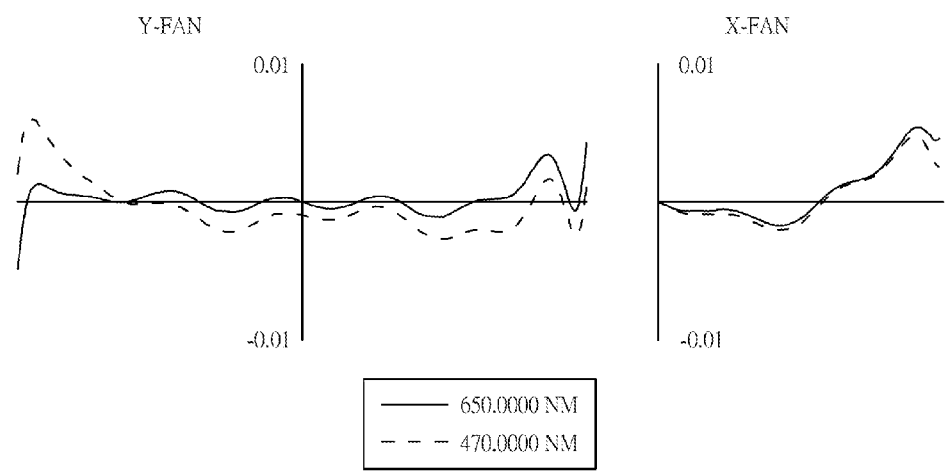
FIG. 1C is a transverse aberration diagram of the longest operation wavelength and the shortest operation wavelength for tangential fan and sagittal fan, wherein the longest operation wavelength and the shortest operation wavelength pass through an edge of the entrance pupil and incident at the position of 0.7 HOI on the image plane, according to the first embodiment of the present invention.

Please refer to FIG. 1A to FIG. 1C. FIG. 1A is a schematic view of the optical image capturing system according to the first embodiment of the present invention. FIG. 1B shows the longitudinal spherical aberration curves, astigmatic field curves, and an optical distortion curve of the optical image capturing system in the order from left to right according to the first embodiment of the present invention. FIG. 1C is a transverse aberration diagram of the longest operation wavelength and the shortest operation wavelength for tangential fan and sagittal fan, wherein the longest operation wavelength and the shortest operation wavelength pass through an edge of the entrance pupil and incident at the position of 0.7 HOI on the image plane, according to the first embodiment of the present invention. As shown in FIG. 1A, in the order from an object side to an image side, the optical image capturing system includes an aperture stop 100, a first lens element 110, a second lens element 120, a third lens element 130, a fourth lens element 140, an IR-bandstop filter 170, an image plane 180, and an image sensing device 190.

The first lens element 110 has positive refractive power and it is made of plastic material. The first lens element 110 has a convex object-side surface 112 and a concave image-side surface 114, and both of the object-side surface 112 and the image-side surface 114 are aspheric and each of them has one inflection point. The length of outline curve of the maximum effective half diameter of the object-side surface of the first lens element is denoted as ARS11. The length of outline curve of the maximum effective half diameter of the image-side surface of the first lens element is denoted as ARS12. The length of outline curve of ½ entrance pupil diameter (HEP) of the object-side surface of the first lens element is denoted as ARE11, and the length of outline curve of ½ entrance pupil diameter (HEP) of the image-side surface of the first lens element is denoted as ARE12. The central thickness of the first lens element on the optical axis is TP1.

A distance paralleling an optical axis from an inflection point on the object-side surface of the first lens element which is nearest to the optical axis to an axial point on the object-side surface of the first lens element is denoted by SGI111. A distance paralleling an optical axis from an inflection point on the image-side surface of the first lens element which is nearest to the optical axis to an axial point on the image-side surface of the first lens element is denoted by SGI121. The following conditions are satisfied: SGI111=0.2008 mm, SGI121=0.0113 mm, |SGI111|/(|SGI111|+TP1)=0.3018 and |SGI121|/(|SGI121|+TP1)=0.0238.

A distance perpendicular to the optical axis from the inflection point on the object-side surface of the first lens element which is nearest to the optical axis to an axial point on the object-side surface of the first lens element is denoted by HIF111. A distance perpendicular to the optical axis from the inflection point on the image-side surface of the first lens element which is nearest to the optical axis to an axial point on the image-side surface of the first lens element is denoted by HIF121. The following conditions are satisfied: HIF111=0.7488 mm, HIF121=0.4451 mm, HIF111/HOI=0.2552 and HIF121/HOI=0.1517.

The second lens element 120 has positive refractive power and it is made of plastic material. The second lens element 120 has a concave object-side surface 122 and a convex image-side surface 124, and both of the object-side surface 122 and the image-side surface 124 are aspheric. The object-side surface 122 has an inflection point. The length of outline curve of the maximum effective half diameter of the object-side surface of the second lens element is denoted as ARS21, and the length of outline curve of the maximum effective half diameter of the image-side surface of the second lens element is denoted as ARS22. The length of outline curve of ½ entrance pupil diameter (HEP) of the object-side surface of the second lens element is denoted as ARE21, and the length of outline curve of ½ entrance pupil diameter (HEP) of the image-side surface of the second lens element is denoted as ARE22. The central thickness of the second lens element on the optical axis is TP2.

A distance paralleling an optical axis from an inflection point on the object-side surface of the second lens element which is nearest to the optical axis to an axial point on the object-side surface of the second lens element is denoted by SGI211. A distance paralleling an optical axis from an inflection point on the image-side surface of the second lens element which is nearest to the optical axis to an axial point on the image-side surface of the second lens element is denoted by SGI221. The following conditions are satisfied: SGI211=−0.1791 mm and |SGI211|/(|SGI211|+TP2)= 0.3109.

A distance perpendicular to the optical axis from the inflection point on the object-side surface of the second lens element which is nearest to the optical axis to an axial point on the object-side surface of the second lens element is denoted by HIF211. A distance perpendicular to the optical axis from the inflection point on the image-side surface of the second lens element which is nearest to the optical axis to an axial point on the image-side surface of the second lens element is denoted by HIF221. The following conditions are satisfied: HIF211=0.8147 mm and HIF211/HOI=0.2777.

The third lens element 130 has negative refractive power and it is made of plastic material. The third lens element 130 has a concave object-side surface 132 and a convex image-side surface 134, and both of the object-side surface 132 and the image-side surface 134 are aspheric. The image-side surface 134 has an inflection point. The length of outline curve of the maximum effective half diameter of the object-side surface of the third lens element is denoted as ARS31, and the length of outline curve of the maximum effective half diameter position of the image-side surface of the third lens element is denoted as ARS32. The length of outline curve of a ½ entrance pupil diameter (HEP) of the object-side surface of the third lens element is denoted as ARE31, and the length of outline curve of the ½ entrance pupil diameter (HEP) of the image-side surface of the third lens element is denoted as ARE32. The central thickness of the third lens element on the optical axis is TP3.

A distance paralleling an optical axis from an inflection point on the object-side surface of the third lens element which is nearest to the optical axis to an axial point on the object-side surface of the third lens element is denoted by SGI311. A distance paralleling an optical axis from an inflection point on the image-side surface of the third lens element which is nearest to the optical axis to an axial point on the image-side surface of the third lens element is denoted by SGI321. The following relationship are satisfied: SGI321=−0.1647 mm; |SGI321|/(|SGI321|+TP3)=0.1884.

A distance perpendicular to the optical axis between the inflection point on the object-side surface of the third lens element which is nearest to the optical axis and the optical axis is denoted by HIF311. A distance perpendicular to the optical axis from the inflection point on the image-side surface of the third lens element which is nearest to the optical axis to an axial point on the image-side surface of the third lens element is denoted by HIF321. The following conditions are satisfied: HIF321=0.7269 mm and HIF321/HOI=0.2477.

The fourth lens element 140 has negative refractive power and it is made of plastic material. The fourth lens element 140 has a convex object-side surface 142 and a concave image-side surface 144; both of the object-side surface 142 and the image-side surface 144 are aspheric. The object-side surface 142 thereof has two inflection points while the image-side surface 144 thereof has an inflection point. The length of the maximum effective half diameter outline curve of the object-side surface of the fourth lens element is denoted as ARS41, and the length of the maximum effective half diameter outline curve of the image-side surface of the fourth lens element is denoted as ARS42. The length of ½ entrance pupil diameter (HEP) outline curve of the object-side surface of the fourth lens element is denoted as ARE41, and the length of the ½ entrance pupil diameter (HEP) outline curve of the image-side surface of the fourth lens element is denoted as ARE42. The central thickness of the fourth lens element on the optical axis is TP4.

A distance paralleling an optical axis from an inflection point on the object-side surface of the fourth lens element which is nearest to the optical axis to an axial point on the object-side surface of the fourth lens element is denoted by SGI411. A distance paralleling an optical axis from an inflection point on the image-side surface of the fourth lens element which is nearest to the optical axis to an axial point on the image-side surface of the fourth lens element is denoted by SGI421. The following conditions are satisfied: SGI411=0.0137 mm, SGI421=−0.0922 mm, |SGI411|/(|SGI41|+TP4)=0.0155 and |SGI421|/(|SGI421|+TP4)=0.0956.

A distance paralleling an optical axis from an inflection point on the object-side surface of the fourth lens element which is the second nearest to the optical axis to an axial point on the object-side surface of the fourth lens element is denoted by SGI412. The following conditions are satisfied: SGI412=−0.1518 mm and |SGI412|/(|SGI412|+TP4)=0.1482.

A distance perpendicular to the optical axis between the inflection point on the object-side surface of the fourth lens element which is nearest to the optical axis and the optical axis is denoted by HIF411. A distance perpendicular to the optical axis between the inflection point on the image-side surface of the fourth lens element which is nearest to the optical axis and the optical axis is denoted by HIF421. The following conditions are satisfied: HIF411=0.2890 mm, HIF421=0.5794 mm, HIF411/HOI=0.0985 and HIF421/HOI=0.1975.

A distance perpendicular to the optical axis between the inflection point on the object-side surface of the fourth lens element which is second nearest to the optical axis and the optical axis is denoted by HIF412. The following conditions are satisfied: HIF412=1.3328 mm and HIF412/HOI=0.4543.

The IR-bandstop filter 170 is made of glass material and is disposed between the fourth lens element 140 and the image plane 180 without affecting the focal length of the optical image capturing system.

In the optical image capturing system of the first embodiment, a focal length of the optical image capturing system is f, an entrance pupil diameter of the optical image capturing system is HEP, and half of a maximal view angle of the optical image capturing system is HAF. The detailed parameters are shown as below: f=3.4375 mm, f/HEP=2.23, HAF=39.69° and tan(HAF)=0.8299.

In the optical image capturing system of the first embodiment, a focal length of the first lens element 110 is f1 and a focal length of the fourth lens element 140 is f4. The following conditions are satisfied: f1=3.2736 mm, |f1/f1|=1.0501, f4=−8.3381 mm and |f1/f4|=0.3926.

In the optical image capturing system of the first embodiment, a focal length of the second lens element 120 is f2 and a focal length of the third lens element 130 is f3. The following conditions are satisfied: |f2|+f3=10.0976 mm, |f1|+|f4|=11.6116 mm and |f2|+f3<|f1|+|f4|.

A ratio of the focal length f of the optical image capturing system to a focal length fp of each of the lens elements with positive refractive powers is PPR. A ratio of the focal length f of the optical image capturing system to a focal length fn of each of the lens elements with negative refractive powers is NPR. In the optical image capturing system of the first embodiment, a sum of the PPR of all lens elements with positive refractive powers is ΣPPR=|f/f1|+|f/f2|=1.95585. A sum of the NPR of all lens elements with negative refractive powers is ΣNPR=|f/f3|+|f/f4|=0.95770, ΣPPR/|ΣNPR|=2.04224. The following conditions are also satisfied: |f/f1|=1.05009, |f/f2|=0.90576, |f/f3|=0.54543 and |f/f4|=0.41227.

In the optical image capturing system of the first embodiment, a distance from the object-side surface 112 of the first lens element to the image-side surface 144 of the fourth lens element is InTL. A distance from the object-side surface 112 of the first lens element to the image plane 180 is HOS. A distance from an aperture 100 to an image plane 180 is InS. Half of a diagonal length of an effective detection field of the image sensing device 190 is HOI. A distance from the image-side surface 144 of the fourth lens element to an image plane 180 is InB. The following conditions are satisfied: InTL+InB=HOS, HOS=4.4250 mm, HOI=2.9340 mm, HOS/HOI=1.5082, HOS/f=1.2873; InTL/HOS=0.7191, InS=4.2128 mm and InS/HOS=0.95204.

In the optical image capturing system of the first embodiment, the sum of central thicknesses of all lens elements with refractive powers on the optical axis is ΣTP. The following conditions are satisfied: ΣTP=2.4437 mm and ΣTP/InTL=0.76793. Therefore, both contrast ratio for the image formation in the optical image capturing system and yield rate of the manufacturing process of the lens element can be balanced, and a proper back focal length is provided to dispose other optical components in the optical image capturing system.

In the optical image capturing system of the first embodiment, a curvature radius of the object-side surface 112 of the first lens element is R1. A curvature radius of the image-side surface 114 of the first lens element is R2. The following condition is satisfied: |R1/R2|=0.1853. Hereby, the first lens element has a suitable magnitude of positive refractive power, so as to prevent the spherical aberration from increasing too fast.

In the optical image capturing system of the first embodiment, a curvature radius of the object-side surface 142 of the fourth lens element is R7. A curvature radius of the image-side surface 144 of the fourth lens element is R8. The following condition is satisfied: (R7−R8)/(R7+R8)=0.2756. As such, the astigmatism generated by the optical image capturing system can be corrected.

In the optical image capturing system of the first embodiment, the focal lengths for the first lens element 110 and the second lens element 120 are respectively f1 and f2. The sum of the focal lengths for all lens elements having positive refractive power is ΣPP, which satisfies the following conditions: ΣPP=f1+f2=7.0688 mm and f1/(f1+f2)=0.4631. Therefore, the positive refractive power of the first lens element 110 may be distributed to other lens elements with positive refractive power appropriately, so as to suppress the generation of noticeable aberrations along the path of travel of the incident light in the optical image capturing system.

In the optical image capturing system of the first embodiment, the focal lengths for the third lens element 130 and the fourth lens element 140 are respectively f3 and f4. The sum of the focal lengths for all lens elements having negative refractive powers is ΣNP, which satisfies the following conditions: ΣNP=f3+f4=−14.6405 mm and f4/(f2+f4)=0.5695. Therefore, the negative refractive power of the fourth lens element may be distributed to other lens elements with negative refractive power appropriately, so as to suppress the generation of noticeable aberrations along the path of travel of the incident light in the optical image capturing system.

In the optical image capturing system of the first embodiment, a distance between the first lens element 110 and the second lens element 120 on the optical axis is IN12. The following conditions are satisfied: IN12=0.3817 mm and IN12/f=0.11105. Hereby, the chromatic aberration of the lens elements can be mitigated, such that the performance of the optical system is increased.

In the optical image capturing system of the first embodiment, a distance between the second lens element 120 and the third lens element 130 on the optical axis is IN23. The following conditions are satisfied: IN23=0.0704 mm and IN23/f=0.02048. Hereby, the chromatic aberration of the lens elements can be mitigated, such that the performance of the optical system is increased.

In the optical image capturing system of the first embodiment, a distance between the third lens element 130 and the fourth lens element 140 on the optical axis is IN34. The following conditions are satisfied: IN34=0.2863 mm and IN34/f=0.08330. Hereby, the chromatic aberration of the lens elements can be mitigated, such that the performance of the optical system is increased.

In the optical image capturing system of the first embodiment, central thicknesses of the first lens element 110 and the second lens element 120 on the optical axis are TP1 and TP2, respectively. The following conditions are satisfied: TP1=0.46442 mm, TP2=0.39686 mm, TP1/TP2=1.17023 and (TP1+IN12)/TP2=2.13213. Hereby, the precision of the manufacturing of the optical image capturing system can be controlled, and the performance thereof can be increased.

In the optical image capturing system of the first embodiment, central thicknesses of the third lens element 130 and the fourth lens element 140 on the optical axis are TP3 and TP4, respectively. The separation distance between the third lens element 130 and the fourth lens element 140 on the optical axis is IN34. The following conditions are satisfied: TP3=0.70989 mm, TP4=0.87253 mm, TP3/TP4=0.81359 and (TP4+IN34)/TP3=1.63248. Hereby, the precision of the manufacturing of the optical image capturing system can be controlled, and the total height of the optical image capturing system can be reduced.

In the optical image capturing system of the first embodiment, the following relations are satisfied: IN23/(TP2+IN23+TP3)=0.05980. Hereby, the aberration generated along the path of travel of the incident light inside the optical system can be slightly corrected by successive lens elements, and the total height of the optical image capturing system can be reduced.

In the optical image capturing system of the first embodiment, a distance paralleling an optical axis from a maximum effective diameter position to an axial point on the object-side surface 142 of the fourth lens element is InRS41. A distance paralleling an optical axis from a maximum effective diameter position to an axial point on the image-side surface 144 of the fourth lens element is InRS42. A central thickness of the fourth lens element 140 is TP4. The following conditions are satisfied: InRS41=−0.23761 mm, InRS42=−0.20206 mm, |InRS41|+|InRS42|=0.43967 mm, |InRS41|/TP4=0.27232 and |InRS42|/TP4=0.23158. Hereby, it is favorable to the manufacturing and molding of the lens element, while maintaining the minimization for the optical image capturing system.

In the optical image capturing system of the first embodiment, a distance perpendicular to the optical axis between a critical point C41 on the object-side surface 142 of the fourth lens element and the optical axis is HVT41. A distance perpendicular to the optical axis between a critical point C42 on the image-side surface 144 of the fourth lens element and the optical axis is HVT42. The following conditions are satisfied: HVT41=0.5695 mm, HVT42=1.3556 mm and HVT41/HVT42=0.4201. With this configuration, the off-axis aberration could be corrected effectively.

In the optical image capturing system of the first embodiment, the following condition is satisfied: HVT42/HOI=0.4620. As such, the aberration at the surrounding field of view of the optical image capturing system may be corrected effectively.

In the optical image capturing system of the first embodiment, the following condition is satisfied: HVT42/HOS=0.3063. As such, the aberration at the surrounding field of view of the optical image capturing system may be corrected effectively.

In the optical image capturing system of the first embodiment, the Abbe number of the first lens element is NA1. The Abbe number of the second lens element is NA2. The Abbe number of the third lens element is NA3. The Abbe number of the fourth lens element is NA4. The following conditions are satisfied: |NA1−NA2|=0 and NA3/NA2=0.39921. Hereby, the chromatic aberration of the optical image capturing system can be corrected.

In the optical image capturing system of the first embodiment, TV distortion and optical distortion for image formation in the optical image capturing system are TDT and ODT, respectively. The following conditions are satisfied: |TDT|=0.4% and |ODT|=2.5%.

In the optical image capturing system of the first embodiment, the transverse aberration of the longest operation wavelength of a positive direction tangential fan passing through the edge of the aperture and incident at the position of 0.7 field of view on the image plane is denoted as PLTA, which is 0.001 mm (pixel size is 1.12 μm). The transverse aberration of the shortest operation wavelength of a positive direction tangential fan passing through the edge of the aperture and incident at the position of 0.7 field of view on the image plane is denoted as PSTA, which is 0.004 mm (pixel size is 1.12 μm). The transverse aberration of the longest operation wavelength of the negative direction tangential fan passing through the edge of the aperture and incident at the position of 0.7 field of view on the image plane is denoted as NLTA, which is 0.003 mm (pixel size is 1.12 μm). The transverse aberration of the shortest operation wavelength of the negative direction tangential fan passing through the edge of the aperture and incident at the position of 0.7 field of view on the image plane is denoted as NSTA, which is −0.003 mm (pixel size is 1.12 μm). The transverse aberration of the longest operation wavelength of the sagittal fan passing through the edge of the aperture and incident at the position of 0.7 field of view on the image plane is denoted as SLTA, which is 0.003 mm (pixel size is 1.12 μm). The transverse aberration of the shortest operation wavelength of the sagittal fan passing through the edge of the aperture and incident at the position of 0.7 field of view on the image plane is denoted as SSTA, which is 0.004 mm (pixel size is 1.12 μm).

Figure 7A:
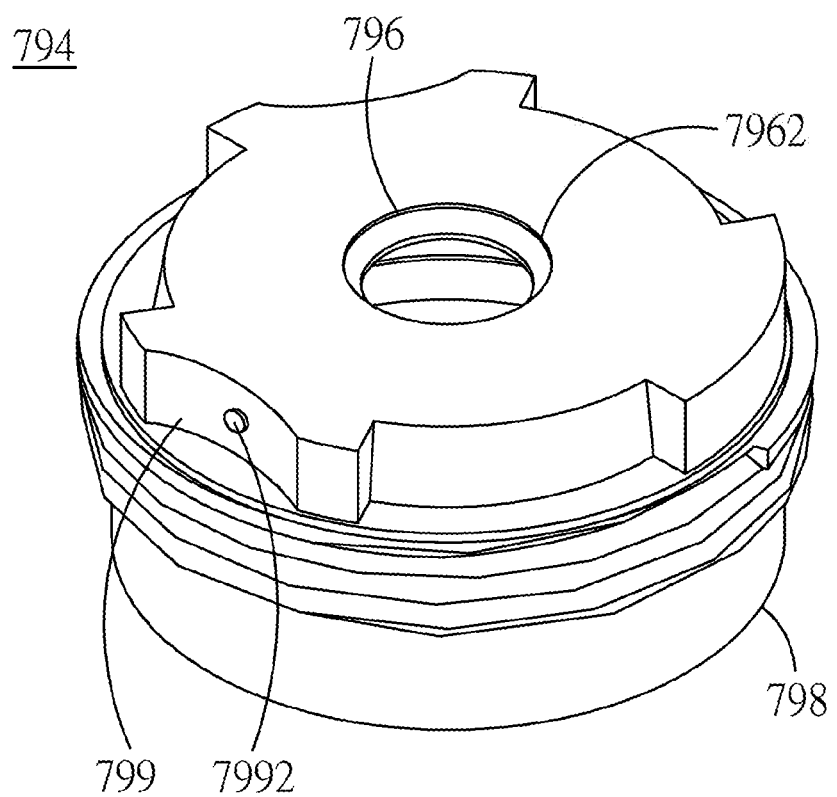
FIG. 7A is the perspective side view of the lens positioning element of the first embodiment of the present invention.
Figure 7B:
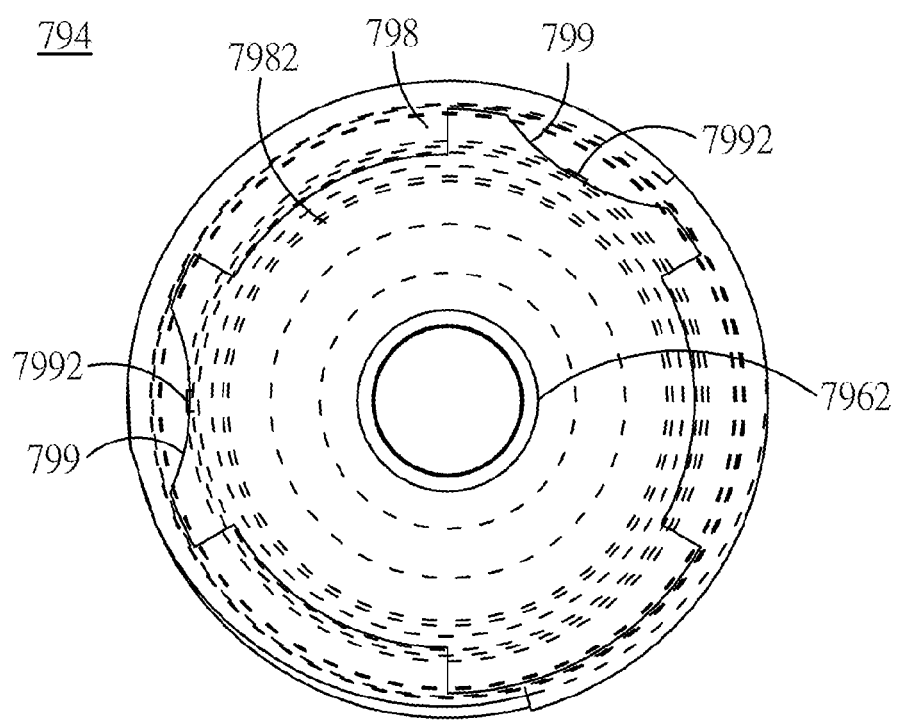
FIG. 7B is the plan view of the lens positioning element of the first embodiment of the present invention, which is taken in the direction from the second opening at the image-side end to the first opening of the object-side end. The outer wall of the lens positioning element is disposed with two tangent planes, and each tangent plane has a sprue mark.
Figure 7C:
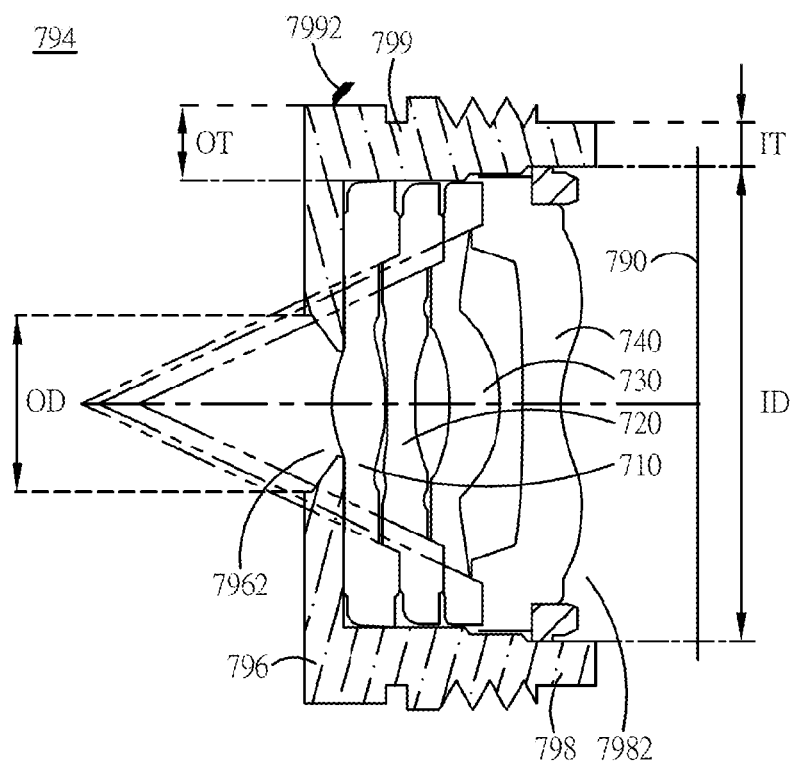
FIG. 7C is the sectional view of the lens positioning element of the first embodiment of the present invention.
Figure 8A:
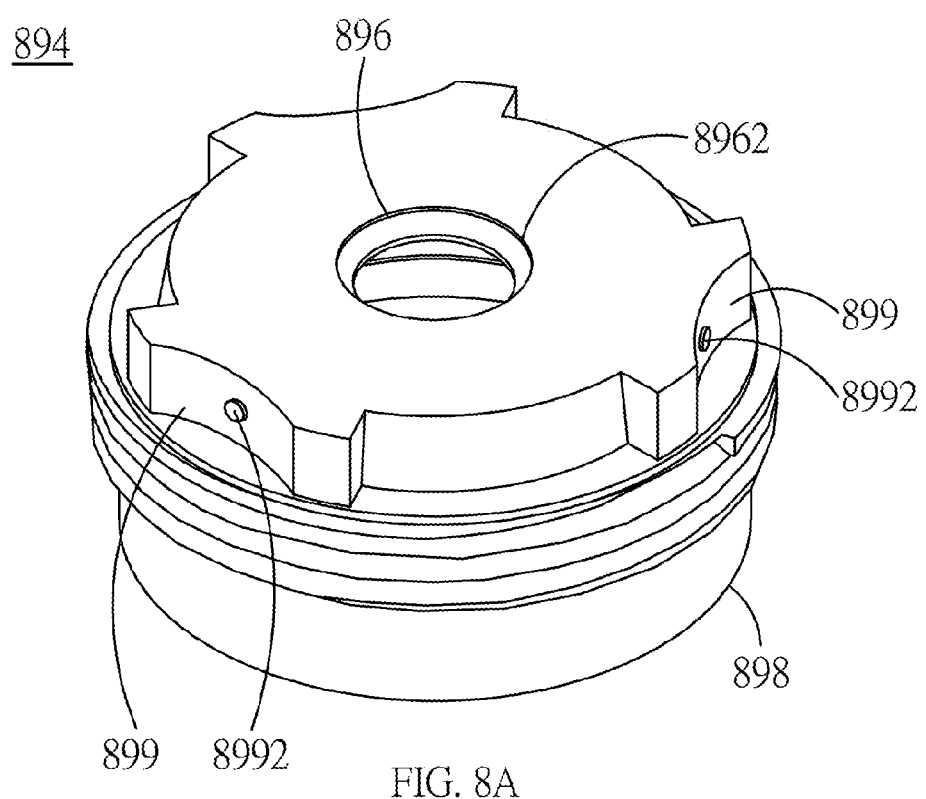
FIG. 8A is the perspective side view illustrating the lens positioning elements of the second to sixth embodiments of the present invention.
Figure 8B:
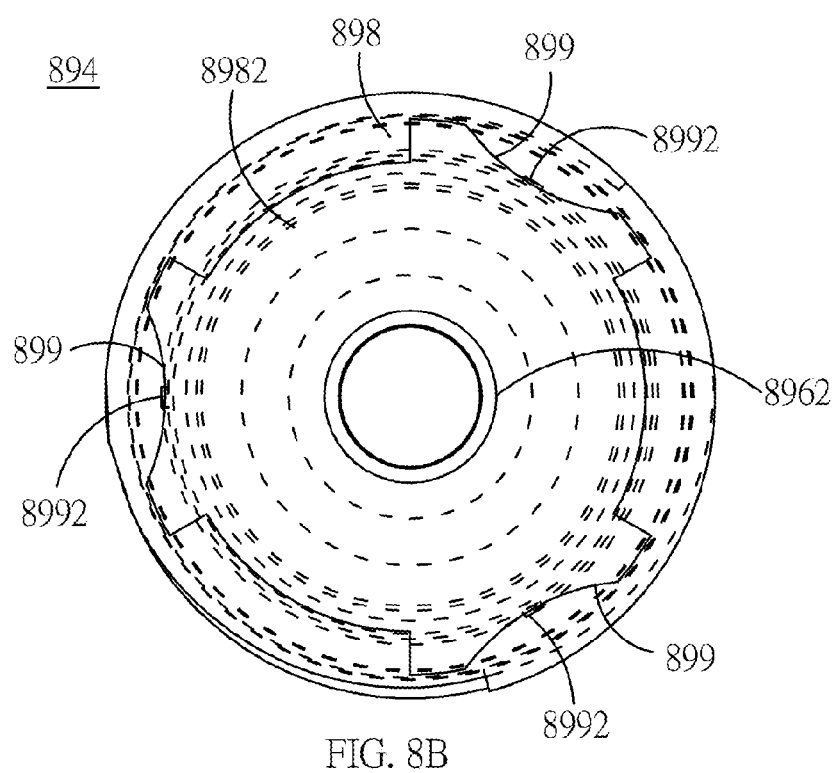
FIG. 8B is the plan view illustrating the lens positioning elements of the second to sixth embodiments of the present invention, which is taken in the direction from the second opening at the image-side end to the first opening of the object-side end. The outer wall of the lens positioning element is disposed with three tangent planes, and each tangent plane has a sprue mark.
Figure 8C:
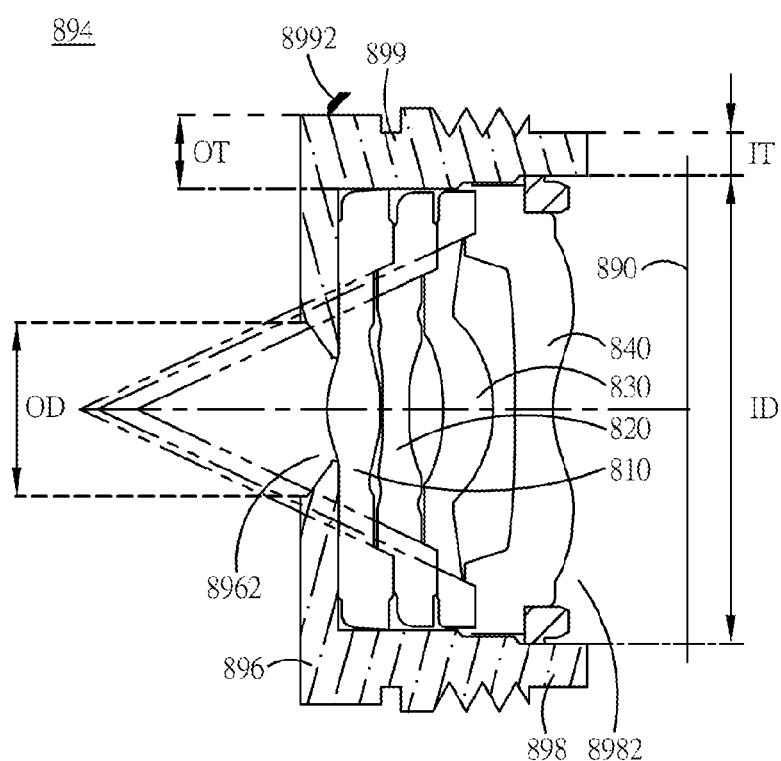
FIG. 8C is the sectional view of the lens positioning elements of the second to sixth embodiments of the present invention.

As shown in FIGS. 7A, 7B and 7C, the lens positioning element 794 of the present invention may be hollow, in order to accommodate any lens element and align the lens elements along the optical axis. The lens positioning element is disposed with an object-side end 796 and an image-side end 798. The object-side end 796 is adjacent to the object side and is disposed with a first opening 7962, whereas the image-side end 798 is adjacent to the image side and is disposed with a second opening 7982. The outer wall of the lens positioning element 794 includes two tangent planes 799, each of the tangent planes 799 has a sprue mark 7992. The inner diameter of the aforementioned first opening 7962 is denoted by OD and the inner diameter of the second opening 7982 is denoted by ID, the following conditions are satisfied: OD=0.8 mm, ID=2.82 mm, and OD/ID=0.2837. The minimum thickness of the object-side end 796 is denoted by OT, whereas the minimum thickness of the image-side end 798 is denoted by IT, the following conditions are satisfied: OT=0.1 mm, IT=0.3 mm, and OT/IT=0.33.

Please refer to the following Table 1 and Table 2.

The detailed data of the optical image capturing system of the first embodiment is as shown in Table 1.

TABLE 1

Lens Parameters for the First Embodiment
f = 3.4375 mm, f/HEP = 2.23, HAF = 39.6900 deg; tan(HAF) = 0.8299

| Surface # | | Curvature Radius | Central Thickness | Material | Refractive Index | Abbe # | Focal length |
|---|---|---|---|---|---|---|---|
| 0 | Object | Plano | At infinity | | | | |
| 1 | Lens 1/ Ape. stop | 1.466388 | 0.464000 | Plastic | 1.535 | 56.07 | 3.274 |
| 2 | | 7.914480 | 0.382000 | | | | |
| 3 | Lens 2 | −5.940659 | 0.397000 | Plastic | 1.535 | 56.07 | 3.795 |
| 4 | | −1.551401 | 0.070000 | | | | |
| 5 | Lens 3 | −0.994576 | 0.710000 | Plastic | 1.642 | 22.46 | −6.302 |
| 6 | | −1.683933 | 0.286000 | | | | |
| 7 | Lens 4 | 2.406736 | 0.873000 | Plastic | 1.535 | 56.07 | −8.338 |
| 8 | | 1.366640 | 0.213000 | | | | |
| 9 | IR-bandstop filter | Plano | 0.210000 | BK7_SCHOTT | 1.517 | 64.13 | |
| 10 | | Plano | 0.820000 | | | | |
| 11 | Image plane | Plano | | | | | |

Reference wavelength = 555 nm, shield position: The 8$^{th}$ surface with clear aperture of 2.320 mm.

As for the parameters of the aspheric surfaces of the first embodiment, reference is made to Table 2.

TABLE 2

Aspheric Coefficients

| Surface # | 1 | 2 | 3 | 4 | 5 | 6 |
|---|---|---|---|---|---|---|
| k = | −1.595426E+00 | −7.056632E+00 | −2.820679E+01 | −1.885740E+00 | 1.013988E−01 | −3.460337E+01 |
| $A_4$ = | −4.325520E−04 | −2.633963E−02 | −1.367865E−01 | −9.745260E−02 | 2.504976E−01 | −9.580611E−01 |
| $A_6$ = | 1.103749E+00 | 2.088207E−02 | 3.135755E−01 | −1.032177E+00 | −1.640463E+00 | 3.303418E+00 |
| $A_8$ = | −8.796867E+00 | −1.122861E−01 | −6.149514E+00 | 8.016230E+00 | 1.354700E+01 | −8.544412E+00 |
| $A_{10}$ = | 3.981982E+01 | −7.137813E−01 | 3.883332E+01 | −4.215882E+01 | −6.223343E+01 | 1.602487E+01 |
| $A_{12}$ = | −1.102573E+02 | 2.236312E+00 | −1.463622E+02 | 1.282874E+02 | 1.757259E+02 | −2.036011E+01 |
| $A_{12}$ = | 1.900642E+02 | −2.756305E+00 | 3.339863E+02 | −2.229568E+02 | −2.959459E+02 | 1.703516E+01 |
| $A_{16}$ = | −2.000279E+02 | 1.557080E+00 | −4.566510E+02 | 2.185571E+02 | 2.891641E+02 | −8.966359E+00 |
| $A_{18}$ = | 1.179848E+02 | −2.060190E+00 | 3.436469E+02 | −1.124538E+02 | −1.509364E+02 | 2.684766E+00 |
| $A_{20}$ = | −3.023405E+01 | 2.029630E+00 | −1.084572E+02 | 2.357571E+01 | 3.243879E+01 | −3.481557E−01 |

| Surface # | 7 | 8 |
|---|---|---|
| k = | −4.860907E+01 | −7.091499E+00 |
| $A_4$ = | −2.043197E−01 | −8.148585E−02 |
| $A_6$ = | 6.516636E−02 | 3.050566E−02 |
| $A_8$ = | 4.863926E−02 | −8.218175E−03 |
| $A_{10}$ = | −7.086809E−02 | 1.186528E−03 |
| $A_{12}$ = | 3.815824E−02 | −1.305021E−04 |
| $A_{14}$ = | −1.032930E−02 | 2.886943E−05 |
| $A_{16}$ = | 1.413303E−03 | −6.459004E−06 |
| $A_{18}$ = | −8.701682E−05 | 6.571792E−07 |
| $A_{20}$ = | 1.566415E−06 | −2.325503E−08 |

The relevant data of the length of outline curve may be obtained from Table 1 and Table 2.

First embodiment (Primary reference wavelength: 555 nm)

| ARE | ½(HEP) | ARE value | ARE − ½(HEP) | 2(ARE/HEP) % | TP | ARE/TP (%) |
|---|---|---|---|---|---|---|
| 11 | 0.771 | 0.808 | 0.037 | 104.77% | 0.464 | 173.90% |
| 12 | 0.771 | 0.771 | 0.000 | 99.99% | 0.464 | 165.97% |
| 21 | 0.771 | 0.797 | 0.026 | 103.38% | 0.397 | 200.80% |
| 22 | 0.771 | 0.828 | 0.057 | 107.37% | 0.397 | 208.55% |
| 31 | 0.771 | 0.832 | 0.061 | 107.97% | 0.710 | 117.25% |
| 32 | 0.771 | 0.797 | 0.026 | 103.43% | 0.710 | 112.32% |
| 41 | 0.771 | 0.771 | 0.000 | 100.05% | 0.873 | 88.39% |
| 42 | 0.771 | 0.784 | 0.013 | 101.69% | 0.873 | 89.84% |

| ARS | EHD | ARS value | ARS − EHD | (ARS/EHD) % | TP | ARS/TP (%) |
|---|---|---|---|---|---|---|
| 11 | 0.771 | 0.808 | 0.037 | 104.77% | 0.464 | 173.90% |
| 12 | 0.812 | 0.814 | 0.002 | 100.19% | 0.464 | 175.25% |
| 21 | 0.832 | 0.877 | 0.045 | 105.37% | 0.397 | 220.98% |
| 22 | 0.899 | 1.015 | 0.116 | 112.95% | 0.397 | 255.83% |
| 31 | 0.888 | 0.987 | 0.098 | 111.07% | 0.710 | 138.98% |
| 32 | 1.197 | 1.237 | 0.041 | 103.41% | 0.710 | 174.31% |
| 41 | 1.642 | 1.689 | 0.046 | 102.81% | 0.873 | 193.53% |
| 42 | 2.320 | 2.541 | 0.221 | 109.54% | 0.873 | 291.23% |

Table 1 is the detailed structural data to the first embodiment in FIG. 1A, wherein the unit for the curvature radius, the central thickness, the distance, and the focal length is millimeters (mm). Surfaces 0-11 illustrate the surfaces from the object side to the image plane in the optical image capturing system. Table 2 shows the aspheric coefficients of the first embodiment, wherein k is the conic coefficient in the aspheric surface equation, and $A_1$-$A_{20}$ are respectively the first to the twentieth order aspheric surface coefficients. Besides, the tables in the following embodiments correspond to the schematic view and the aberration graphs, respectively, and definitions of parameters in these tables are similar to those in the Table 1 and the Table 2, so the repetitive details will not be given here.

The Second Embodiment (Embodiment 2)

Figure 2A:
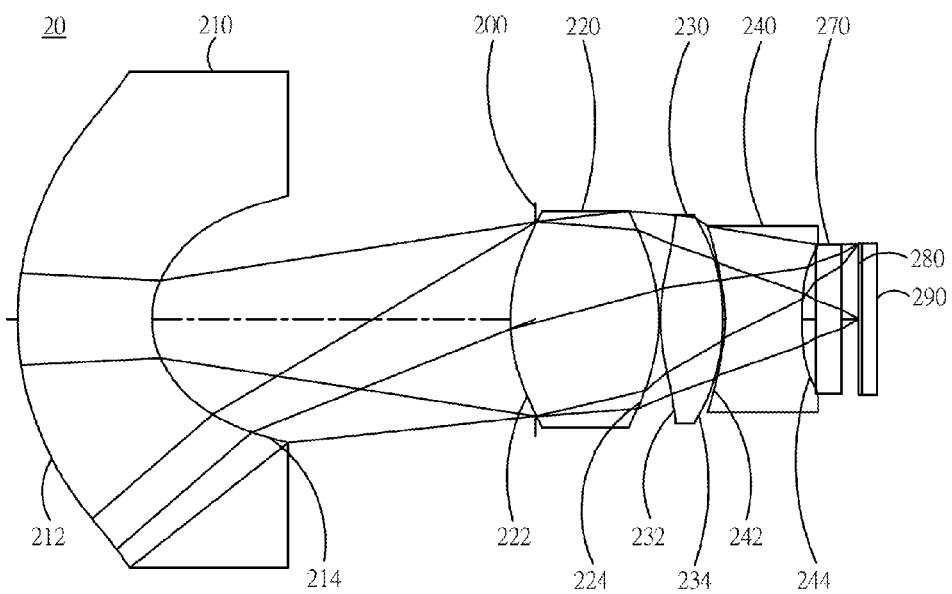
FIG. 2A is a schematic view of the optical image capturing system according to the second embodiment of the present application.
Figure 2B:
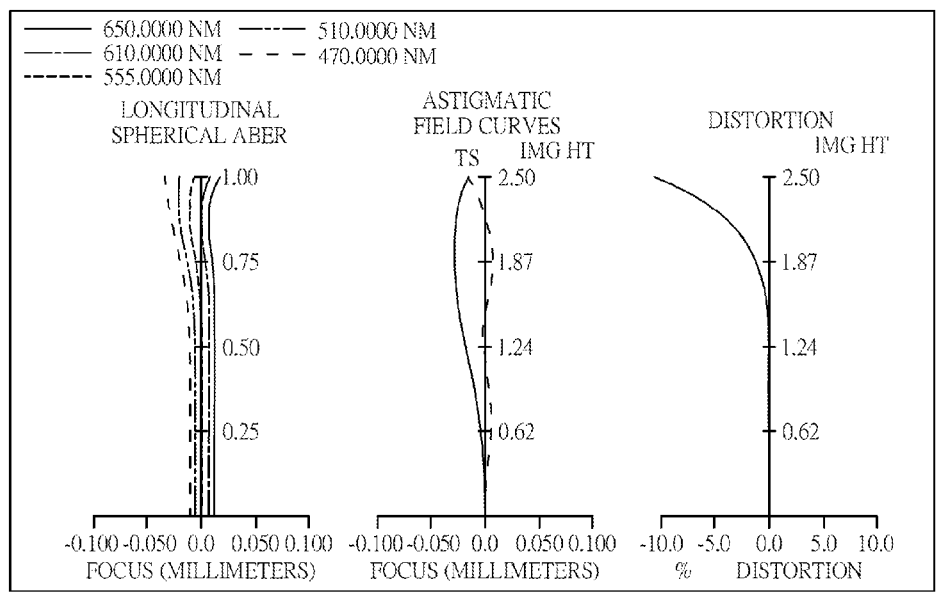
FIG. 2B is longitudinal spherical aberration curves, astigmatic field curves, and an optical distortion curve of the optical image capturing system in the order from left to right according to the second embodiment of the present application.
Figure 2C:
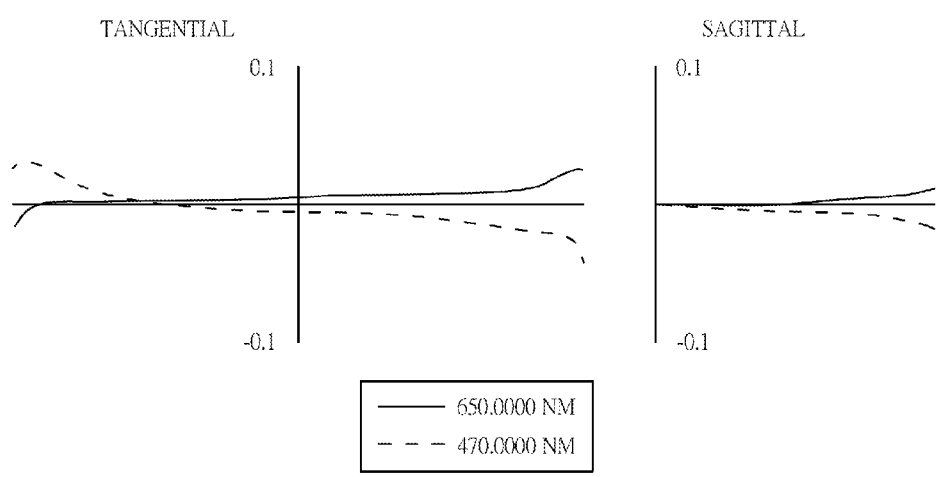
FIG. 2C is a transverse aberration diagram of the longest operation wavelength and the shortest operation wavelength for tangential fan and sagittal fan, wherein the longest operation wavelength and the shortest operation wavelength pass through an edge of the entrance pupil and incident at the position of 0.7 HOI on the image plane, according to the second embodiment of the present invention.

Please refer to FIG. 2A, FIG. 2B and FIG. 2C. FIG. 2A is a schematic view of the optical image capturing system according to the second embodiment of the present invention. FIG. 2B shows the longitudinal spherical aberration curves, astigmatic field curves, and an optical distortion curve of the optical image capturing system of the second embodiment, in the order from left to right. FIG. 2C is a transverse aberration diagram of the longest operation wavelength and the shortest operation wavelength for tangential fan and sagittal fan, wherein the longest operation wavelength and the shortest operation wavelength pass through an edge of the aperture stop and incident at the position of 0.7 HOI on the image plane, according to optical image capturing system of the second embodiment. As shown in FIG. 2A, in the order from an object side to an image side, the optical image capturing system includes a first lens element 210, an aperture stop 200, a second lens element 220, a third lens element 230, a fourth lens element 240, an IR-bandstop filter 270, an image plane 280, and an image sensing device 290.

The first lens element 210 has negative refractive power and it is made of plastic material. The first lens element 210 has a convex object-side surface 212 and a concave image-side surface 214, and both of the object-side surface 212 and the image-side surface 214 are aspheric. The object-side surface 212 thereof has one inflection point.

The second lens element 220 has positive refractive power and it is made of plastic material. The second lens element 220 has a convex object-side surface 222 and a convex image-side surface 224, and both of the object-side surface 222 and the image-side surface 224 are aspheric.

The third lens element 230 has positive refractive power and it is made of plastic material. The third lens element 230 has a convex object-side surface 232 and a convex image-side surface 234, and both of the object-side surface 232 and the image-side surface 234 are aspheric. The object-side surface 232 of the third lens element 230 has two inflection points while the image-side surface 234 thereof has one inflection point.

The fourth lens element 240 has negative refractive power and it is made of plastic material. The fourth lens element 240 has a concave object-side surface 242 and a concave image-side surface 244, both of the object-side surface 242 and the image-side surface 244 are aspheric. The image-side surface 244 has an inflection point.

The IR-bandstop filter 270 is made of glass material. The IR-bandstop filter 270 is disposed between the fourth lens element 240 and the image plane 280 without affecting the focal length of the optical image capturing system Please refer to the following Table 3 and Table 4.

The detailed data of the optical image capturing system of the second embodiment is as shown in Table 3.

TABLE 3

Lens Parameters for the Second Embodiment
f = 3.04877 mm; f/HEP = 1.0; HAF = 42.4981 deg

| Surface # | | Curvature Radius | Central Thickness | Material | Refractive Index | Abbe # | Focal length |
|---|---|---|---|---|---|---|---|
| 0 | Object | 1E+18 | 1E+13 | | | | |
| 1 | Lens 1 | 9.849837174 | 4.434 | Plastic | 1.530 | 55.80 | −10.923391 |
| 2 | | 3.082824404 | 12.633 | | | | |
| 3 | Ape. stop | 1E+18 | −0.828 | | | | |
| 4 | Lens 2 | 5.751414794 | 4.884 | Plastic | 1.565 | 58.00 | 5.913076 |
| 5 | | −5.564185415 | 0.050 | | | | |
| 6 | Lens 3 | 6.451923165 | 2.050 | Plastic | 1.565 | 58.00 | 6.546736 |
| 7 | | −7.729181467 | 0.078 | | | | |
| 8 | Lens 4 | −5.087872701 | 2.536 | Plastic | 1.661 | 20.40 | −5.71156 |
| 9 | | 18.16482235 | 0.450 | | | | |
| 10 | IR-bandstop filter | 1E+18 | 0.850 | BK7_SCHOTT | 1.517 | 64.13 | |
| 11 | | 1E+18 | 0.550 | | | | |
| 12 | Image plane | 1E+18 | −0.003 | | | | |

Reference wavelength = 555 nm

As for the parameters of the aspheric surfaces of the second embodiment, reference is made to

TABLE 4

Table 4. Aspheric Coefficients

| Surface # | 1 | 2 | 4 | 5 | 6 | 7 |
|---|---|---|---|---|---|---|
| k = | −2.239375E−01 | −9.997749E−01 | 9.665902E−03 | −2.743608E+00 | −5.533981E+00 | −6.476812E−01 |
| $A_4$ = | 4.110823E−05 | 2.864488E−03 | −7.339949E−04 | 3.925685E−04 | 3.754725E−04 | −1.649180E−03 |
| $A_6$ = | −2.372430E−06 | 5.856089E−05 | −4.437352E−05 | −6.388903E−05 | −2.271689E−04 | 6.186752E−05 |
| $A_8$ = | 7.277639E−08 | 9.256187E−07 | 1.371918E−06 | 3.504802E−06 | −9.137401E−06 | −7.840983E−06 |
| $A_{10}$ = | −9.700335E−10 | 4.529687E−07 | −1.270303E−07 | −5.082157E−08 | 1.212839E−06 | 5.352954E−07 |
| $A_{12}$ = | 0.000000E+00 | 0.000000E+00 | 0.000000E+00 | 0.000000E+00 | 0.000000E+00 | 0.000000E+00 |

| Surface# | 8 | 9 |
|---|---|---|
| k = | −9.687854E+00 | 2.601692E+01 |
| $A_4$ = | 2.445680E−03 | 1.573966E−02 |
| $A_6$ = | −3.169853E−04 | −5.828513E−04 |
| $A_8$ = | 1.253882E−05 | −1.251600E−04 |
| $A_{10}$ = | −4.006837E−07 | 6.362923E−06 |
| $A_{12}$ = | 0.000000E+00 | 0.000000E+00 |

In the second embodiment, the presentation of the aspheric surface formula is similar to that in the first embodiment. Besides, the definitions of parameters in following tables are identical to those in the first embodiment, so the repetitious details will not be given here.

The following contents may be obtained from Table 3 and Table 4.

| Second embodiment (Primary reference wavelength = 555 nm) | | | | | |
|---|---|---|---|---|---|
| InRS41 | InRS42 | HVT41 | HVT42 | ODT % | TDT % |
| −0.59249 | 0.52337 | 0.00000 | 0.00000 | −10.44760 | 10.32060 |
| \|f/f1\| | \|f/f2\| | \|f/f3\| | \|f/f4\| | \|f1/f2\| | \|f2/f3\| |
| 0.27910 | 0.51560 | 0.46569 | 0.53379 | 1.84733 | 0.90321 |
| ΣPPR | ΣNPR | ΣPPR/\|ΣNPR\| | ΣPP | ΣNP | f1/ΣPP |
| 1.04939 | 0.74480 | 1.40896 | 0.20152 | −4.37666 | −28.34240 |
| f4/ΣNP | IN12/f | IN23/f | IN34/f | TP3/f | TP4/f |
| 2.49583 | 3.87195 | 0.01640 | 0.02559 | 0.67241 | 0.83166 |
| InTL | HOS | HOS/HOI | InS/HOS | InTL/HOS | ΣTP/InTL |
| 25.83600 | 27.68300 | 11.07320 | 0.38350 | 0.93328 | 0.53814 |
| (TP1 + IN12)/TP2 | (TP4 + IN34)/TP3 | TP1/TP2 | TP3/TP4 | IN23/(TP2 + IN23 + TP3) | |
| 3.32475 | 1.27488 | 0.90778 | 0.80852 | 0.00716 | |
| \|InRS41\|/TP4 | \|InRS42\|/TP4 | HVT42/HOI | HVT42/HOS | | |
| 0.23367 | 0.20641 | 0 | 0 | | |
| PLTA | PSTA | NLTA | NSTA | SLTA | SSTA |
| −0.047 mm | 0.028 mm | 0.029 mm | −0.018 mm | −0.025 mm | 0.018 mm |
| OD | ID | OD/ID | OT | IT | OT/IT |
| 8.2 mm | 2.958 mm | 2.7721 | 0.9 mm | 0.1 mm | 9 |

The following contents may be obtained from Table 3 and Table 4.

| Values Related to Inflection Point of Second Embodiment (Primary Reference Wavelength = 555 nm) | | | | | | |
|---|---|---|---|---|---|---|
| HIF111 | 7.1935 | HIF111/HOI | 2.8774 | SGI111 | 2.9188 | \|SGI111\|/(\|SGI111\| + TP1) | 0.3970 |
| HIF311 | 1.9747 | HIF311/HOI | 0.7899 | SGI111 | 0.2667 | \|SGI311\|/(\|SGI311\| + TP3) | 0.1151 |
| HIF312 | 3.1679 | HIF312/HOI | 1.2672 | SGI312 | 0.4747 | \|SGI312\|/(\|SGI312\| + TP3) | 0.1880 |
| HIF321 | 3.3358 | HIF321/HOI | 1.3343 | SGI321 | −0.8799 | \|SGI321\|/(\|SGI321\| + TP3) | 0.3003 |
| HIF421 | 2.3479 | HIF421/HOI | 0.9391 | SGI421 | 0.4718 | \|SGI421\|/(\|SGI421\| + TP4) | 0.1569 |

The relevant data of the length of outline curve may be obtained from Table 3 and Table 4.

| Second embodiment (Primary reference wavelength: 555 nm) | | | | | | |
|---|---|---|---|---|---|---|
| ARE | ½(HEP) | ARE value | ARE − ½(HEP) | 2(ARE/HEP) % | TP | ARE/TP (%) |
| 11 | 1.524 | 1.530 | 0.006 | 100.38% | 4.434 | 34.51% |
| 12 | 1.524 | 1.590 | 0.066 | 104.31% | 4.434 | 35.86% |
| 21 | 1.524 | 1.541 | 0.017 | 101.12% | 4.884 | 31.56% |
| 22 | 1.524 | 1.541 | 0.017 | 101.11% | 4.884 | 31.56% |
| 31 | 1.524 | 1.536 | 0.012 | 100.77% | 2.050 | 74.93% |
| 32 | 1.524 | 1.535 | 0.011 | 100.71% | 2.050 | 74.89% |
| 41 | 1.524 | 1.538 | 0.014 | 100.89% | 2.536 | 60.66% |
| 42 | 1.524 | 1.535 | 0.011 | 100.71% | 2.536 | 60.55% |
| ARS | EHD | ARS value | ARS − EHD | (ARS/EHD) % | TP | ARS/TP (%) |
| 11 | 8.116 | 9.103 | 0.988 | 112.17% | 4.434 | 205.32% |
| 12 | 4.024 | 6.273 | 2.249 | 155.89% | 4.434 | 141.49% |
| 21 | 3.233 | 3.377 | 0.144 | 104.46% | 4.884 | 69.14% |
| 22 | 3.582 | 3.748 | 0.166 | 104.65% | 4.884 | 76.74% |
| 31 | 3.441 | 3.484 | 0.043 | 101.24% | 2.050 | 169.93% |
| 32 | 3.366 | 3.528 | 0.161 | 104.79% | 2.050 | 172.08% |
| 41 | 3.084 | 3.151 | 0.067 | 102.18% | 2.536 | 124.26% |
| 42 | 2.458 | 2.546 | 0.088 | 103.58% | 2.536 | 100.43% |

The Third Embodiment (Embodiment 3)

Figure 3A:
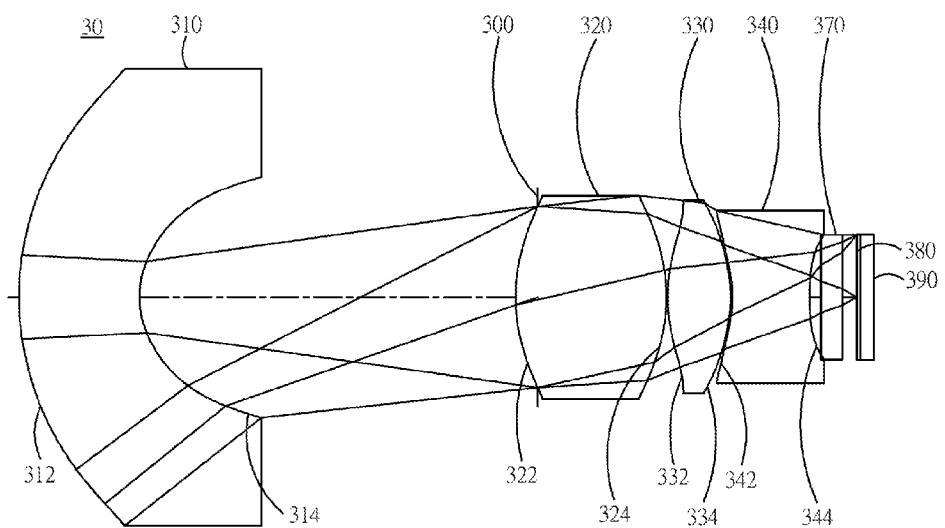
FIG. 3A is a schematic view of the optical image capturing system according to the third embodiment of the present application.
Figure 3B:
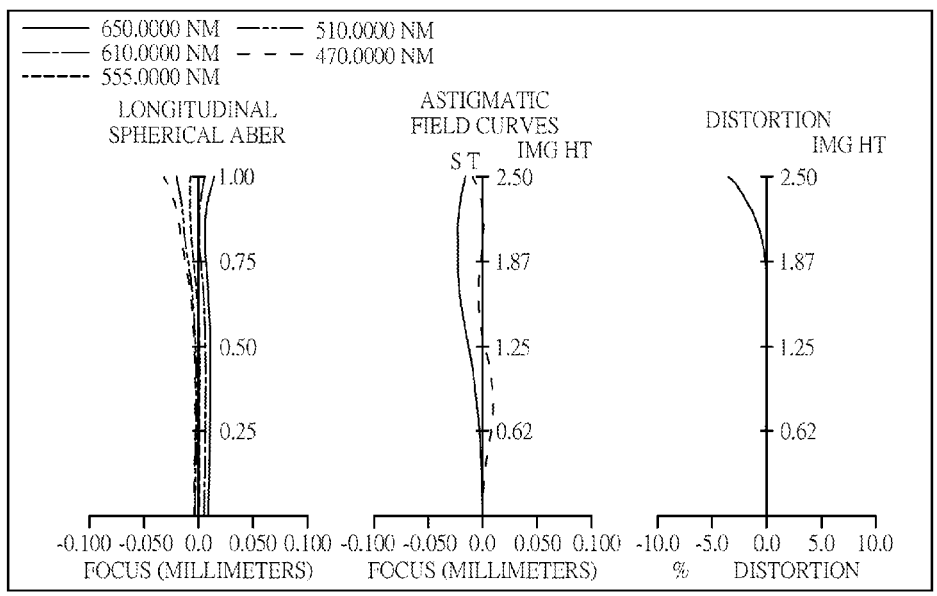
FIG. 3B is longitudinal spherical aberration curves, astigmatic field curves, and an optical distortion curve of the optical image capturing system in the order from left to right according to the third embodiment of the present application.
Figure 3C:
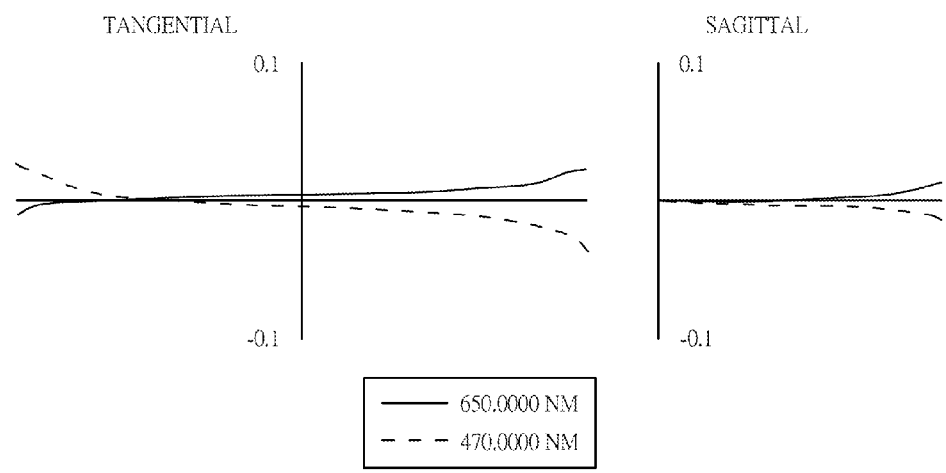
FIG. 3C is a transverse aberration diagram of the longest operation wavelength and the shortest operation wavelength for tangential fan and sagittal fan, wherein the longest operation wavelength and the shortest operation wavelength pass through an edge of the entrance pupil and incident at the position of 0.7 HOI on the image plane, according to the third embodiment of the present invention.

Please refer to FIG. 3A to FIG. 3C. FIG. 3A is a schematic view of the optical image capturing system according to the third embodiment of the present invention. FIG. 3B shows the longitudinal spherical aberration curves, astigmatic field curves, and an optical distortion curve of the optical image capturing system, in the order from left to right, according to the third embodiment of the present invention. FIG. 3C is a transverse aberration diagram of the longest operation wavelength and the shortest operation wavelength for tangential fan and sagittal fan, wherein the longest operation wavelength and the shortest operation wavelength pass through an edge of the aperture stop and incident at the position of 0.7 HOI on the image plane, according to the third embodiment of the present invention. As shown in FIG. 3A, in the order from an object side to an image side, the optical image capturing system includes a first lens element 310, an aperture stop 300, a second lens element 320, a third lens element 330, a fourth lens element 340, an IR-bandstop filter 370, an image plane 380, and an image sensing device 390.

The first lens element 310 has negative refractive power and it is made of plastic material. The first lens element 310 has a convex object-side surface 312 and a concave image-side surface 314, and both of the object-side surface 312 and the image-side surface 314 are aspheric. The object-side surface 312 has one inflection point.

The second lens element 320 has positive refractive power and it is made of plastic material. The second lens element 320 has a convex object-side surface 322 and a convex image-side surface 324, and both of the object-side surface 322 and the image-side surface 324 are aspheric.

The third lens element 330 has positive refractive power and it is made of plastic material. The third lens element 330 has a convex object-side surface 332 and a convex image-side surface 334, and both of the object-side surface 332 and the image-side surface 334 are aspheric. The object-side surface 332 has two inflection points and the image-side surface 334 has one inflection point.

The fourth lens element 340 has negative refractive power and it is made of plastic material. The fourth lens element 340 has a concave object-side surface 342 and a concave image-side surface 344, and both of the object-side surface 342 and the image-side surface 344 are aspheric. The object-side surface 342 has two inflection points.

The IR-bandstop filter 370 is made of glass material. The IR-bandstop filter 370 is disposed between the fourth lens element 340 and the image plane 380 without affecting the focal length of the optical image capturing system.

Please refer to the following Table 5 and Table 6.

The detailed data of the optical image capturing system of the third embodiment is as shown in Table 5.

TABLE 5

Lens Parameters for the Third Embodiment
f = 3.3798 mm; f/HEP = 1.0; HAF = 37.4984 deg

| Surface # | | Curvature Radius | Central Thickness | Material | Refractive Index | Abbe # | Focal length |
|---|---|---|---|---|---|---|---|
| 0 | Object | 1E+18 | 1E+13 | | | | |
| 1 | Lens 1 | 11.76523035 | 4.784 | Plastic | 1.565 | 58.00 | −13.181938 |
| 2 | | 3.897367792 | 15.807 | | | | |
| 3 | Ape. Stop | 1E+18 | −0.879 | | | | |
| 4 | Lens 2 | 7.126055808 | 5.979 | Plastic | 1.565 | 58.00 | 7.27 |
| 5 | | −6.802855023 | 0.050 | | | | |
| 6 | Lens 3 | 6.670417053 | 2.489 | Plastic | 1.565 | 58.00 | 6.24 |
| 7 | | −6.513825093 | 0.074 | | | | |
| 8 | Lens 4 | −4.973689449 | 3.070 | Plastic | 1.661 | 20.40 | −5.34 |
| 9 | | 15.58116466 | 0.450 | | | | |
| 10 | IR-bandstop filter | 1E+18 | 0.850 | BK7_SCHOTT | 1.517 | 64.13 | |
| 11 | | 1E+18 | 0.577 | | | | |
| 12 | Image plane | 1E+18 | −0.003 | | | | |

Reference wavelength = 555 nm

As for the parameters of the aspheric surfaces of the third embodiment, reference is made to Table 6.

TABLE 6

Aspheric Coefficients

| Surface # | | | | |
|---|---|---|---|---|
| | 1 | 2 | 4 | 5 |
| k = | −3.478078E−01 | −1.027098E+00 | 6.999876E−02 | −2.548024E+00 |
| $A_4$ = | 6.494523E−05 | 1.649261E−03 | −4.565849E−04 | 1.471902E−04 |
| $A_6$ = | −1.398242E−06 | 2.168277E−05 | −1.952807E−05 | −4.299375E−05 |
| $A_8$ = | 3.992733E−08 | 2.002647E−07 | 3.868102E−07 | 2.917163E−06 |
| $A_{10}$ = | −3.401221E−10 | 9.606331E−08 | −3.447688E−08 | −7.077230E−08 |
| $A_{12}$ = | 0.000000E+00 | 0.000000E+00 | 0.000000E+00 | 0.000000E+00 |

| Surface # | | | | |
|---|---|---|---|---|
| | 6 | 7 | 8 | 9 |
| k = | −4.710817E+00 | −4.847408E+00 | −7.323635E+00 | 1.553616E+01 |
| $A_4$ = | 7.707558E−04 | −5.351266E−04 | 2.098474E−03 | 1.182229E−02 |
| $A_6$ = | −1.205195E−04 | 9.777220E−06 | −9.231357E−05 | −5.221428E−04 |
| $A_8$ = | −8.300287E−06 | −5.936044E−06 | 3.058575E−06 | 4.642373E−05 |

TABLE 6-continued

| Aspheric Coefficients | | | |
|---|---|---|---|
| $A_{10} =$ | 5.257710E−07 | 2.881147E−07 | −1.312267E−07 | −6.683008E−06 |
| $A_{12} =$ | 0.000000E+00 | 0.000000E+00 | 0.000000E+00 | 0.000000E+00 |

The presentation of the aspheric surface formula in the third embodiment is similar to that in the first embodiment. Besides, the definitions of parameters in following tables are identical to those in the first embodiment so the repetitious details will not be given here.

The following contents may be obtained from Table 5 and Table 6.

| Third embodiment (Primary reference wavelength: 555 nm) | | | | | | |
|---|---|---|---|---|---|---|
| InRS41 | InRS42 | HVT41 | HVT42 | ODT % | TDT % | |
| −0.62485 | 0.55701 | 0.00000 | 0.00000 | −3.52921 | 3.56300 | |
| \|f/f1\| | \|f/f2\| | \|f/f3\| | \|f/f4\| | \|f1/f2\| | \|f2/f3\| | |
| 0.25640 | 0.46494 | 0.54156 | 0.63348 | 1.81335 | 1.16480 | |
| ΣPPR | ΣNPR | ΣPPR/\|ΣNPR\| | ΣPP | ΣNP | f1/ΣPP | |
| 1.09841 | 0.79796 | 1.37653 | 1.93402 | −6.94104 | −2.75867 | |
| f4/ΣNP | IN12/f | IN23/f | IN34/f | TP3/f | TP4/f | |
| 1.89912 | 4.41692 | 0.01479 | 0.02176 | 0.73653 | 0.90847 | |
| InTL | HOS | HOS/HOI | InS/HOS | InTL/HOS | ΣTP/InTL | |
| 31.37450 | 33.24820 | 13.29928 | 0.38070 | 0.94365 | 0.52025 | |
| (TP1 + IN12)/TP2 | (TP4 + IN34)/TP3 | TP1/TP2 | TP3/TP4 | IN23/(TP2 + IN23 + TP3) | | |
| 3.29694 | 1.26299 | 0.80012 | 0.81074 | 0.00587 | | |
| \|InRS41\|/TP4 | \|InRS42\|/TP4 | HVT42/HOI | HVT42/HOS | | | |
| 0.20351 | 0.18141 | 0 | 0 | | | |
| PLTA | PSTA | NLTA | NSTA | SLTA | SSTA | |
| −0.042 mm | 0.025 mm | 0.030 mm | −0.012 mm | −0.018 mm | 0.015 mm | |
| OD | ID | OD/ID | OT | IT | OT/IT | |
| 9.2 mm | 2.984 mm | 3.083 | 0.8 mm | 0.1 mm | 8 | |

The following contents may be obtained from Table 5 and Table 6.

| Values Related to Inflection Point of Third Embodiment (Primary Reference Wavelength = 555 nm) | | | | | | |
|---|---|---|---|---|---|---|
| HIF111 | 805201 | HIF111/HOI | 3.4080 | SGI111 | 3.6372 | \|SGI111\|/(\|SGI111\| + TP1) | 0.4319 |
| HIF311 | 2.3119 | HIF311/HOI | 0.9248 | SGI311 | 0.3630 | \|SGI311\|/(\|SGI311\| + TP3) | 0.1273 |
| HIF312 | 3.7326 | HIF312/HOI | 1.4930 | SGI312 | 0.6324 | \|SGI312\|/(\|SGI312\| + TP3) | 0.2026 |
| HIF321 | 3.7319 | HIF321/HOI | 1.4928 | SGI321 | −1.0035 | \|SGI321\|/(\|SGI321\| + TP3) | 0.2873 |
| HIF411 | 2.0667 | HIF411/HOI | 0.8267 | SGI411 | −0.3191 | \|SGI411\|/(\|SGI411\| + TP4) | 0.0942 |
| HIF412 | 3.1486 | HIF412/HOI | 1.2594 | SGI412 | −0.5588 | \|SGI412\|/(\|SGI412\| + TP4) | 0.1540 |

The relevant data of the length of outline curve may be obtained from Table 5 and Table 6.

| Third embodiment (Primary reference wavelength: 555 nm) | | | | | | |
|---|---|---|---|---|---|---|
| ARE | ½(HEP) | ARE value | ARE − ½(HEP) | 2(ARE/HEP) % | TP | ARE/TP (%) |
| 11 | 1.690 | 1.695 | 0.005 | 100.30% | 4.784 | 35.43% |
| 12 | 1.690 | 1.745 | 0.055 | 103.26% | 4.784 | 36.48% |
| 21 | 1.690 | 1.704 | 0.015 | 100.86% | 5.979 | 28.51% |
| 22 | 1.690 | 1.705 | 0.015 | 100.91% | 5.979 | 28.52% |
| 31 | 1.690 | 1.705 | 0.015 | 100.91% | 2.489 | 68.50% |
| 32 | 1.690 | 1.706 | 0.016 | 100.96% | 2.489 | 68.54% |
| 41 | 1.690 | 1.709 | 0.019 | 101.11% | 3.070 | 55.65% |
| 42 | 1.690 | 1.705 | 0.015 | 100.91% | 3.070 | 55.54% |
| ARS | EHD | ARS value | ARS − EHD | (ARS/EHD) % | TP | ARS/TP (%) |
| 11 | 9.150 | 10.353 | 1.203 | 113.15% | 4.784 | 216.41% |
| 12 | 4.825 | 7.383 | 2.558 | 153.01% | 4.784 | 154.33% |
| 21 | 3.637 | 3.770 | 0.132 | 103.64% | 5.979 | 63.05% |
| 22 | 4.065 | 4.252 | 0.187 | 104.60% | 5.979 | 71.12% |
| 31 | 3.857 | 3.920 | 0.064 | 101.65% | 2.489 | 157.48% |
| 32 | 3.767 | 3.943 | 0.176 | 104.68% | 2.489 | 158.41% |
| 41 | 3.461 | 3.523 | 0.062 | 101.79% | 3.070 | 114.73% |
| 42 | 2.484 | 2.588 | 0.104 | 104.17% | 3.070 | 84.28% |

The Fourth Embodiment (Embodiment 4)

Figure 4A:
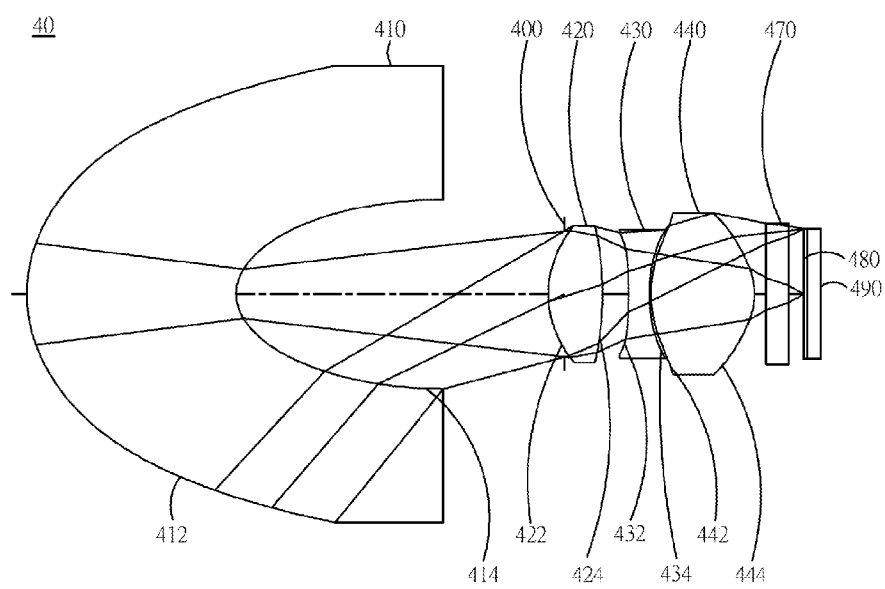
FIG. 4A is a schematic view of the optical image capturing system according to the fourth embodiment of the present application.
Figure 4B:
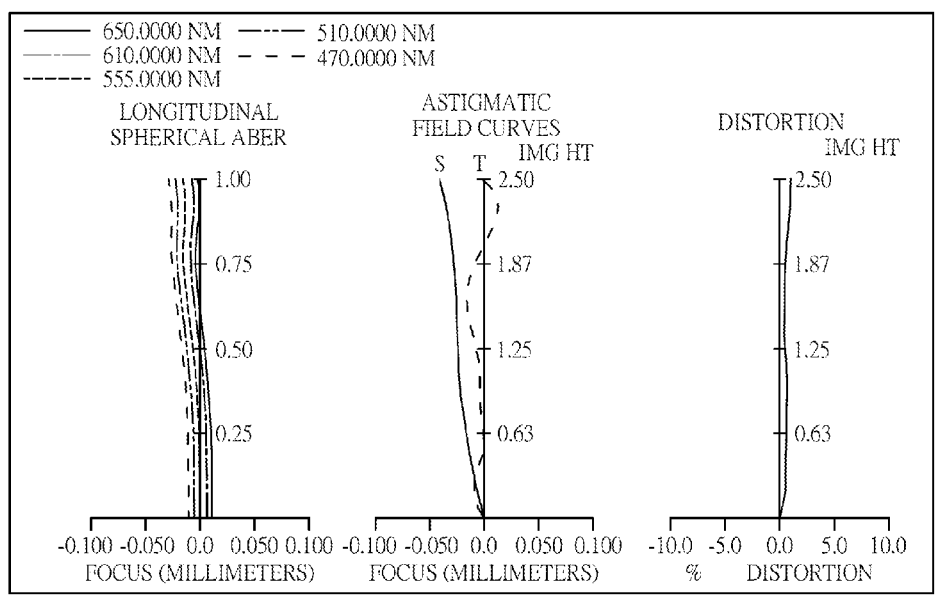
FIG. 4B is longitudinal spherical aberration curves, astigmatic field curves, and an optical distortion curve of the optical image capturing system in the order from left to right according to the fourth embodiment of the present application.
Figure 4C:
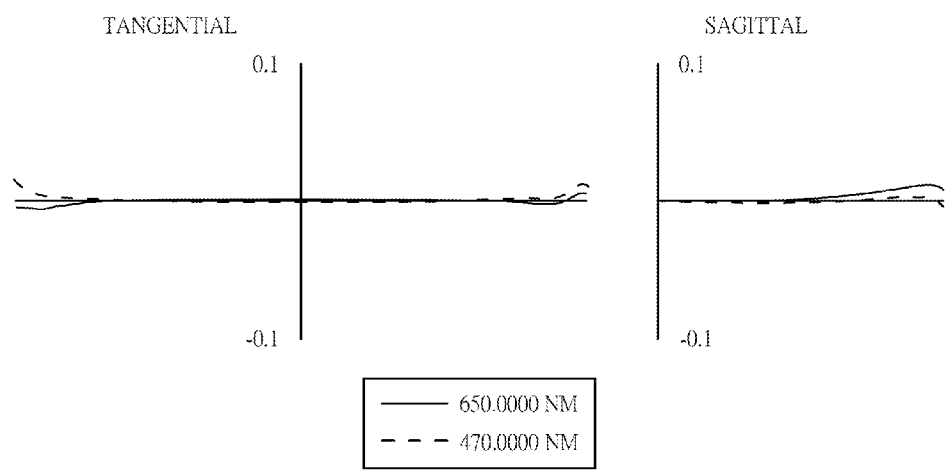
FIG. 4C is a transverse aberration diagram of the longest operation wavelength and the shortest operation wavelength for tangential fan and sagittal fan, wherein the longest operation wavelength and the shortest operation wavelength pass through an edge of the entrance pupil and incident at the position of 0.7 HOI on the image plane, according to the fourth embodiment of the present invention.

Please refer to FIG. 4A to FIG. 4C. FIG. 4A is a schematic view of the optical image capturing system according to the fourth embodiment of the present invention. FIG. 4B shows the longitudinal spherical aberration curves, astigmatic field curves, and an optical distortion curve of the optical image capturing system, in the order from left to right, according to the fourth embodiment of the present invention. FIG. 4C is a transverse aberration diagram of the longest operation wavelength and the shortest operation wavelength for tangential fan and sagittal fan, wherein the longest operation wavelength and the shortest operation wavelength pass through an edge of the aperture stop and incident at the position of 0.7 HOI on the image plane, according to the fourth embodiment of the present invention. As shown in FIG. 4A, in the order from an object side to an image side, the optical image capturing system includes a first lens element 410, an aperture stop 400, a second lens element 420, a third lens element 430, a fourth lens element 440, an IR-bandstop filter 470, an image plane 480, and an image sensing device 490.

The first lens element 410 has negative refractive power and it is made of plastic material. The first lens element 410 has a convex object-side surface 412 and a concave image-side surface 414, and both of the object-side surface 412 and the image-side surface 414 are aspheric.

The second lens element 420 has positive refractive power and it is made of plastic material. The second lens element 420 has a convex object-side surface 422 and a convex image-side surface 424, and both of the object-side surface 422 and the image-side surface 424 are aspheric.

The third lens element 430 has negative refractive power and it is made of plastic material. The third lens element 430 has a concave object-side surface 432 and a concave image-side surface 434, and both of the object-side surface 432 and the image-side surface 434 are aspheric.

The fourth lens element 440 has positive refractive power and it is made of plastic material. The fourth lens element 440 has a convex object-side surface 442 and a convex image-side surface 444, and both of the object-side surface 442 and the image-side surface 444 are aspheric. The object-side surface 442 has one inflection point.

The IR-bandstop filter 470 is made of glass material. The IR-bandstop filter 470 is disposed between the fourth lens element 440 and the image plane 480 without affecting the focal length of the optical image capturing system.

Please refer to the following Table 7 and Table 8.

The detailed data of the optical image capturing system of the fourth embodiment is as shown in Table 7.

TABLE 7

Lens Parameters for the Fourth Embodiment
f = 3.88783 mm; f/HEP = 1.0; HAF = 32.5 deg

| Surface # | | Curvature Radius | Central Thickness | Material | Refractive Index | Abbe # | Focal length |
|---|---|---|---|---|---|---|---|
| 0 | Object | 1E+18 | 1E+13 | | | | |
| 1 | Lens 1 | 5.670019454 | 7.998 | Plastic | 1.565 | 54.50 | −16.974434 |
| 2 | | 1.746917987 | 12.581 | | | | |
| 3 | Ape. Stop | 1E+18 | −0.616 | | | | |
| 4 | Lens 2 | 3.930042884 | 2.074 | Plastic | 1.565 | 58.00 | 5.45 |
| 5 | | −11.69551685 | 0.989 | | | | |
| 6 | Lens 3 | −16.52238717 | 0.801 | Plastic | 1.661 | 20.40 | −7.45 |
| 7 | | 7.245785897 | 0.050 | | | | |
| 8 | Lens 4 | 4.334011471 | 3.965 | Plastic | 1.565 | 58.00 | 3.47 |
| 9 | | −2.405817816 | 0.450 | | | | |
| 10 | IR-band stop filter | 1E+18 | 0.850 | BK7_SCHOTT | 1.517 | 64.13 | |
| 11 | | 1E+18 | 0.598 | | | | |
| 12 | Image plane | 1E+18 | −0.012 | | | | |

Reference wavelength = 555 nm

As for the parameters of the aspheric surfaces of the fourth embodiment, reference is made to Table 8.

TABLE 8

Aspheric Coefficients

| | Surface# | | | |
|---|---|---|---|---|
| | 1 | 2 | 4 | 5 |
| k = | −6.449180E−01 | −7.705157E−01 | −6.016311E−01 | −2.488488E+01 |
| $A_4$ = | 1.500548E−04 | 2.513122E−04 | 8.955844E−04 | −1.438135E−03 |
| $A_6$ = | −4.596455E−07 | 6.215427E−04 | 6.654743E−05 | 4.294092E−05 |
| $A_8$ = | 1.051643E−07 | −4.372290E−05 | 1.092904E−05 | 2.916946E−06 |
| $A_{10}$ = | −8.993803E−10 | 1.116177E−06 | −1.527249E−06 | −1.310421E−06 |
| $A_{12}$ = | 0.000000E+00 | 0.000000E+00 | 0.000000E+00 | 0.000000E+00 |

| | Surface# | | | |
|---|---|---|---|---|
| | 6 | 7 | 8 | 9 |
| k = | −3.586288E+01 | 4.536350E+00 | −2.353731E+00 | −3.782837E+00 |
| $A_4$ = | 2.660797E−03 | 9.585163E−03 | 1.826377E−04 | −5.825593E−03 |
| $A_6$ = | −2.258218E−03 | −1.647093E−03 | 2.387347E−04 | 2.516191E−04 |
| $A_8$ = | 2.101585E−05 | −2.627373E−05 | −7.886019E−05 | 2.542939E−05 |
| $A_{10}$ = | 1.682810E−05 | 1.541524E−05 | 4.097602E−06 | −3.477041E−06 |
| $A_{12}$ = | 0.000000E+00 | 0.000000E+00 | 0.000000E+00 | 0.000000E+00 |

The presentation of the aspheric surface formula in the fourth embodiment is similar to that in the first embodiment. Besides the definitions of parameters in following tables are identical to those in the first embodiment so the repetitious details will not be given here.

The following contents may be obtained from Table 7 and Table 8.

| Fourth embodiment (Primary reference wavelength: 555 nm) | | | | | |
|---|---|---|---|---|---|
| InRS41 | InRS42. | HVT41 | HVT42 | \|ODT\| % | \|TDT\| % |
| 0.68865 | −1.57973 | 0.00000 | 0.00000 | 1.00097 | 0.60050 |
| \|f/f1\| | \|f/f2\| | \|f/f3\| | \|f/f4\| | \|f1/f2\| | \|f2/f3\| |
| 0.22904 | 0.71313 | 0.52162 | 1.12124 | 3.11357 | 0.73145 |
| ΣPPR | ΣNPR | ΣPPR/\|ΣNPR\| | ΣPP | ΣNP | f1/ΣPP |
| 1.23476 | 1.35028 | 0.91444 | −2.00156 | −13.50697 | −2.72375 |
| f4/ΣNP | IN12/f | IN23/f | IN34/f | TP3/f | TP4/f |
| 1.25671 | 3.07735 | 0.25450 | 0.01286 | 0.20608 | 1.01981 |
| InTL | HOS | HOS/HOI | InS/HOS | InTL/HOS | ΣTP/InTL |
| 27.84200 | 29.72730 | 11.89092 | 0.30774 | 0.93658 | 0.53295 |
| (TP1 + IN12)/TP2 | (TP4 + IN34)/TP3 | TP1/TP2 | TP3/TP4 | IN23/(TP2 + IN23 + TP3) | |
| 9.62547 | 5.01108 | 3.85662 | 0.20207 | 0.25603 | |
| \|InRS41\|/TP4 | \|InRS42\|/TP4 | HVT42/HOI | HVT42/HOS | | |
| 0.17369 | 0.39843 | 0 | 0 | 0.17369 | |
| PLTA | PSTA | NLTA | NSTA | SLTA | SSTA |
| 0.012 mm | 0.006 mm | 0.018 mm | −0.005 mm | −0.005 mm | 0.009 mm |
| OD | ID | OD/ID | OT | IT | OT/IT |
| 7.5 mm | 3.082 mm | 2.4335 | 0.7 mm | 0.1 mm | 7 |

The following contents may be obtained from Table 7 and Table 8.

| Values Related to Inflection Point of Fourth Embodiment (Primary Reference Wavelength = 555 nm) | | | | | |
|---|---|---|---|---|---|
| HIF411 | 2.2723 | HIF411/HOI | 0.9089 | SGI411 | 0.5454 | \|SGI411\|/(\|SGI411\| + TP4) | 0.1209 |

The relevant data of the length of outline curve may be obtained from Table 7 and Table 8.

| Fourth embodiment (Primary reference wavelength: 555 nm) | | | | | | |
|---|---|---|---|---|---|---|
| ARE | ½(HEP) | ARE value | ARE − ½(HEP) | 2(ARE/HEP) % | TP | ARE/TP (%) |
| 11 | 1.944 | 1.982 | 0.038 | 101.95% | 7.998 | 24.78% |
| 12 | 1.944 | 2.372 | 0.428 | 122.04% | 7.998 | 29.66% |
| 21 | 1.944 | 2.031 | 0.087 | 104.47% | 2.074 | 97.92% |
| 22 | 1.944 | 1.952 | 0.008 | 100.40% | 2.074 | 94.11% |
| 31 | 1.944 | 1.956 | 0.012 | 100.64% | 0.801 | 244.18% |
| 32 | 1.944 | 1.987 | 0.043 | 102.20% | 0.801 | 247.96% |
| 41 | 1.944 | 1.999 | 0.055 | 102.81% | 3.965 | 50.41% |
| 42 | 1.944 | 2.075 | 0.131 | 106.72% | 3.965 | 52.32% |
| ARS | EHD | ARS value | ARS − EHD | (ARS/EHD) % | TP | ARS/TP (%) |
| 11 | 7.459 | 10.892 | 3.433 | 146.03% | 7.998 | 136.18% |
| 12 | 3.059 | 5.165 | 2.106 | 168.85% | 7.998 | 64.58% |
| 21 | 2.555 | 2.771 | 0.216 | 108.47% | 2.074 | 133.62% |
| 22 | 2.489 | 2.509 | 0.020 | 100.79% | 2.074 | 120.97% |
| 31 | 2.220 | 2.253 | 0.033 | 101.48% | 0.801 | 281.22% |
| 32 | 2.272 | 2.345 | 0.073 | 103.21% | 0.801 | 292.67% |
| 41 | 2.335 | 2.421 | 0.086 | 103.68% | 3.965 | 61.05% |
| 42 | 2.582 | 2.847 | 0.265 | 110.28% | 3.965 | 71.80% |

The Fifth Embodiment (Embodiment 5)

Figure 5A:
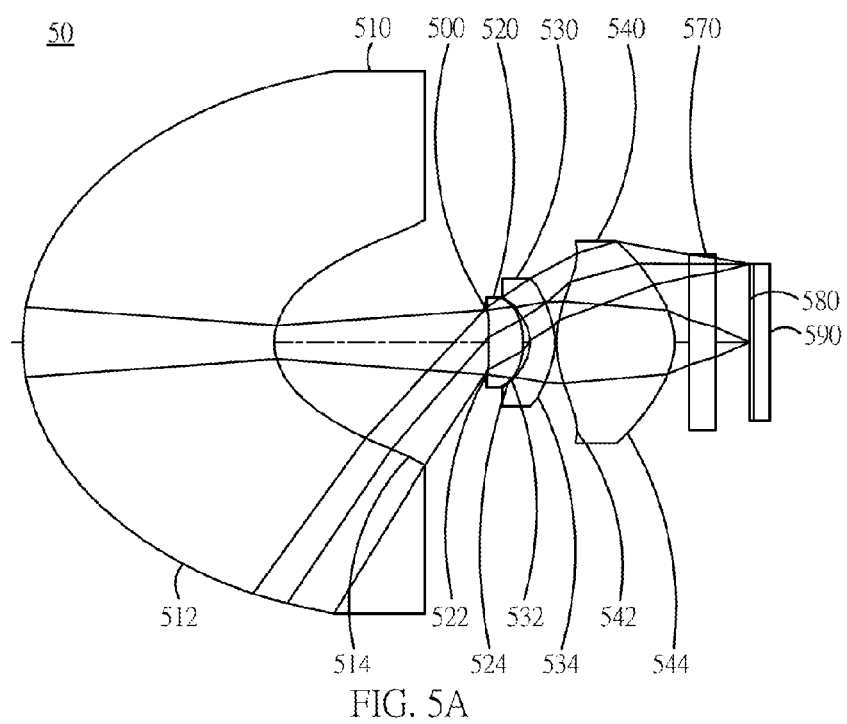
FIG. 5A is a schematic view of the optical image capturing system according to the fifth embodiment of the present application.
Figure 5B:
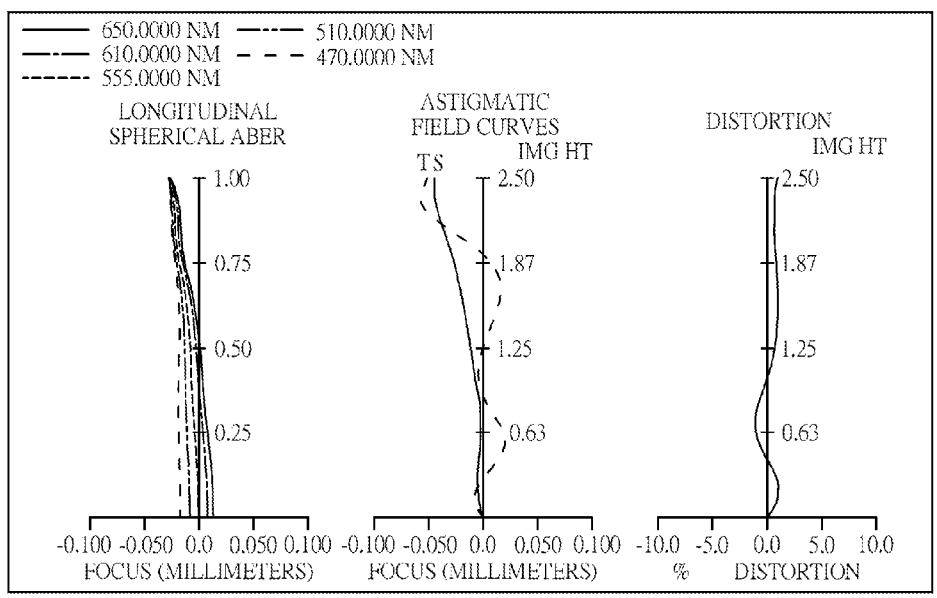
FIG. 5B is longitudinal spherical aberration curves, astigmatic field curves, and an optical distortion curve of the optical image capturing system in the order from left to right according to the fifth embodiment of the present application.
Figure 5C:
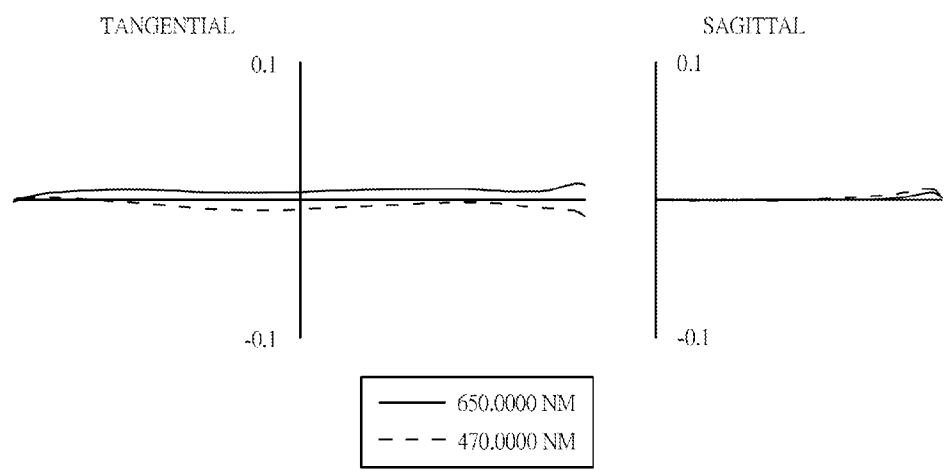
FIG. 5C is a transverse aberration diagram of the longest operation wavelength and the shortest operation wavelength for tangential fan and sagittal fan, wherein the longest operation wavelength and the shortest operation wavelength pass through an edge of the entrance pupil and incident at the position of 0.7 HOI on the image plane, according to the fifth embodiment of the present invention.

Please refer to FIG. 5A to FIG. 5C. FIG. 5A is a schematic view of the optical image capturing system according to the fifth embodiment of the present invention. FIG. 5B shows the longitudinal spherical aberration curves, astigmatic field curves, and an optical distortion curve of the optical image capturing system, in the order from left to right, according to the fifth embodiment of the present invention. FIG. 5C is a transverse aberration diagram of the longest operation wavelength and the shortest operation wavelength for tangential fan and sagittal fan, wherein the longest operation wavelength and the shortest operation wavelength pass through an edge of the aperture stop and incident at the position of 0.7 HOI on the image plane, according to the optical image capturing system of the fifth embodiment. As shown in FIG. 5A, in the order from an object side to an image side, the optical image capturing system includes a first lens element 510, an aperture stop 500, a second lens element 520, a third lens element 530, a fourth lens element 540, an IR-bandstop filter 570, an image plane 580, and an image sensing device 590.

The first lens element 510 has negative refractive power and it is made of plastic material. The first lens element 510 has a convex object-side surface 512 and a concave image-side surface 514, and both of the object-side surface 512 and the image-side surface 514 are aspheric. The image-side surface 514 has one inflection point.

The second lens element 520 has positive refractive power and it is made of plastic material. The second lens element 520 has a concave object-side surface 522 and a convex image-side surface 524, and both of the object-side surface 522 and the image-side surface 524 are aspheric.

The third lens element 530 has negative refractive power and it is made of plastic material. The third lens element 530 has a concave object-side surface 532 and a convex image-side surface 534, and both of the object-side surface 532 and the image-side surface 534 are aspheric.

The fourth lens element 540 has positive refractive power and it is made of plastic material. The fourth lens element 540 has a convex object-side surface 542 and a convex image-side surface 544, and both of the object-side surface 542 and the image-side surface 544 are aspheric. The object-side surface 542 has one inflection point.

The IR-bandstop filter 570 is made of glass material. The IR-bandstop filter 570 is disposed between the fourth lens element 540 and the image plane 580 without affecting the focal length of the optical image capturing system.

Please refer to the following Table 9 and Table 10. The detailed data of the optical image capturing system of the fifth embodiment is as shown in Table 9.

TABLE 9

Lens Parameters for the Fifth Embodiment
f = 2.70119 mm; f/HEP = 1.2; HAF = 42.4998 deg

| Surface# | | Curvature Radius | Central Thickness | Material | Refractive Index | Abbe # | Focal length |
|---|---|---|---|---|---|---|---|
| 0 | Object | 1E+18 | 1E+13 | | | | |
| 1 | Lens 1 | 6.158747547 | 8.000 | Plastic | 1.661 | 20.40 | −14.843327 |
| 2 | | 1.82361617 | 6.690 | | | | |
| 3 | Ape. Stop | 1E+18 | 0.143 | | | | |
| 4 | Lens 2 | −42.98520341 | 1.079 | Plastic | 1.565 | 58.00 | 5.63 |
| 5 | | −2.998039358 | 0.229 | | | | |
| 6 | Lens 3 | −1.186191791 | 0.786 | Plastic | 1.661 | 20.40 | −6.50 |
| 7 | | −2.065807718 | 0.050 | | | | |
| 8 | Lens 4 | 2.969788662 | 3.757 | Plastic | 1.565 | 58.00 | 3.01 |
| 9 | | −2.178138596 | 0.450 | | | | |
| 10 | IR-bandstop filter | 1E+18 | 0.850 | BK_7 | 1.517 | 64.13 | |
| 11 | | 1E+18 | 1.090 | | | | |
| 12 | Image plane | 1E+18 | −0.018 | | | | |

Reference wavelength = 555 nm

As for the parameters of the aspheric surfaces of the fifth embodiment, reference is made to Table 10.

TABLE 10

Aspheric Coefficients

| | Surface # | | | |
|---|---|---|---|---|
| | 1 | 2 | 4 | 5 |
| k = | −5.268242E−01 | −8.177104E−01 | −2.131511E+01 | 2.973521E+00 |
| $A_4$ = | 9.775202E−05 | −2.201820E−03 | −2.151681E−02 | −4.795028E−02 |
| $A_6$ = | −6.257699E−06 | −5.079458E−05 | −2.172492E−02 | 1.669960E−02 |
| $A_8$ = | 1.353415E−07 | 4.552189E−05 | 2.286686E−02 | −1.561019E−02 |
| $A_{10}$ = | −9.694921E−10 | −3.618230E−06 | −1.308899E−02 | 3.849928E−03 |
| $A_{12}$ = | 0.000000E+00 | 0.000000E+00 | 0.000000E+00 | 0.000000E+00 |

| | Surface # | | | |
|---|---|---|---|---|
| | 6 | 7 | 8 | 9 |
| k = | −8.719402E−01 | −2.536702E+00 | −2.770874E+00 | −2.417730E+00 |
| $A_4$ = | 6.206569E−02 | 1.330541E−02 | −1.217373E−02 | −3.383517E−03 |
| $A_6$ = | −1.408895E−02 | 1.600899E−03 | 2.270720E−03 | 5.625596E−04 |
| $A_8$ = | −9.870109E−03 | −1.863735E−03 | −2.673098E−04 | −5.679854E−05 |
| $A_{10}$ = | 2.238140E−03 | 1.801866E−04 | 1.010995E−05 | 1.080656E−06 |
| $A_{12}$ = | 0.000000E+00 | 0.000000E+00 | 0.000000E+00 | 0.000000E+00 |

The presentation of the aspheric surface formula in the fifth embodiment is similar to that in the first embodiment. Besides the definitions of parameters in following tables are identical to those in the first embodiment so the repetitious details will not be given here.

The following contents may be obtained from Table 9 and Table 10.

Fifth embodiment (Primary reference wavelength: 555 nm)

| InRS41 | InRS42 | HVT41 | HVT42 | ODT % | TDT % |
|---|---|---|---|---|---|
| 0.65072 | −1.86019 | 0.00000 | 0.00000 | −1.09946 | 0.37266 |
| |f/f1| | |f/f2| | |f/f3| | |f/f4| | |f1/f2| | |f2/f3| |

-continued

| Fifth embodiment (Primary reference wavelength: 555 nm) | | | | | |
|---|---|---|---|---|---|
| 0.18198 | 0.47968 | 0.41531 | 0.89677 | 2.63590 | 0.86580 |
| ΣPPR | ΣNPR | ΣPPR/|ΣNPR| | ΣPP | ΣNP | f1/ΣPP |
| 0.89499 | 1.07875 | 0.82966 | −0.87282 | −11.83117 | −6.45174 |
| f4/ΣNP | IN12/f | IN23/f | IN34/f | TP3/f | TP4/f |
| 1.25459 | 2.52981 | 0.08463 | 0.01851 | 0.29113 | 1.39072 |
| InTL | HOS | HOS/HOI | InS/HOS | InTL/HOS | ΣTP/InTL |
| 20.73420 | 23.10680 | 9.24272 | 0.36425 | 0.89732 | 0.65699 |
| (TP1 + IN12)/TP2 | (TP4 + IN34)/TP3 | TP1/TP2 | TP3/TP4 | IN23/(TP2 + IN23 + TP3) | |
| 13.74606 | 4.84061 | 7.41352 | 0.20934 | 0.10917 | |
| |InRS41|/TP4 | |InRS42|/TP4 | HVT42/HOI | HVT42/HOS | | |
| 0.17322 | 0.49518 | 0.00000 | 0.00000 | | |
| PLTA | PSTA | NLTA | NSTA | SLTA | SSTA |
| −0.013 mm | 0.012 mm | 0.001 mm | −0.001 mm | 0.005 mm | 0.002 mm |
| OD | ID | OD/ID | OT | IT | OT/IT |
| 8.5 mm | 3.743 mm | 2.2709 | 0.7 mm | 0.1 mm | 7 |

The following contents may be obtained from Table 9 and Table 10.

| Values Related to Inflection Point of Fifth Embodiment (Primary Reference Wavelength = 555 nm) | | | | | | |
|---|---|---|---|---|---|---|
| HIF121 | 3.4251 | HIF121/HOI | 1.3700 | SGI121 | 3.7002 | |SGI121|/(|SGI121| + TP1) | 0.3163 |
| HIF411 | 1.7710 | HIF411/HOI | 0.7084 | SGI411 | 0.3914 | |SGI411|/(|SGI411| + TP4) | 0.0944 |

The relevant data of the length of outline curve may be obtained from Table 9 and Table 10.

| Fifth embodiment (Primary reference wavelength: 555 nm) | | | | | |
|---|---|---|---|---|---|
| ARE | ½(HEP) | ARE value | ARE − ½(HEP) | 2(ARE/HEP) % | TP | ARE/TP (%) |
| 11 | 1.125 | 1.131 | 0.006 | 100.52% | 8.000 | 14.14% |
| 12 | 1.125 | 1.194 | 0.068 | 106.08% | 8.000 | 14.92% |
| 21 | 1.111 | 1.117 | 0.005 | 100.49% | 1.079 | 103.47% |
| 22 | 1.125 | 1.194 | 0.069 | 106.12% | 1.079 | 110.68% |
| 31 | 1.125 | 1.257 | 0.131 | 111.65% | 0.786 | 159.79% |
| 32 | 1.125 | 1.161 | 0.035 | 103.15% | 0.786 | 147.63% |
| 41 | 1.125 | 1.144 | 0.019 | 101.65% | 3.757 | 30.46% |
| 42 | 1.125 | 1.166 | 0.041 | 103.63% | 3.757 | 31.05% |
| ARS | EHD | ARS value | ARS − EHD | (ARS/EHD) % | TP | ARS/TP (%) |
| 11 | 8.435 | 12.938 | 4.503 | 153.38% | 8.000 | 161.73% |
| 12 | 3.571 | 5.683 | 2.113 | 159.17% | 8.000 | 71.04% |
| 21 | 1.111 | 1.117 | 0.005 | 100.49% | 1.079 | 103.47% |
| 22 | 1.430 | 1.693 | 0.263 | 118.36% | 1.079 | 156.87% |
| 31 | 1.447 | 1.763 | 0.316 | 121.83% | 0.786 | 224.19% |
| 32 | 2.056 | 2.236 | 0.181 | 108.79% | 0.786 | 284.40% |
| 41 | 2.856 | 2.941 | 0.086 | 103.01% | 3.757 | 78.30% |
| 42 | 3.243 | 3.838 | 0.595 | 118.35% | 3.757 | 102.18% |

The Sixth Embodiment (Embodiment 6)

Figure 6A:
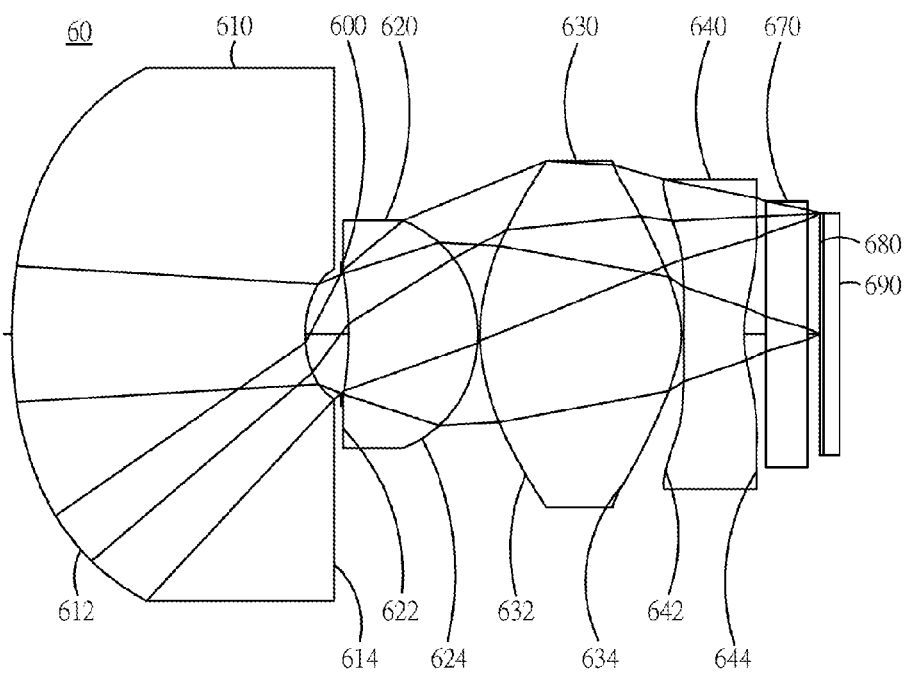
FIG. 6A is a schematic view of the optical image capturing system according to the sixth embodiment of the present application.
Figure 6B:
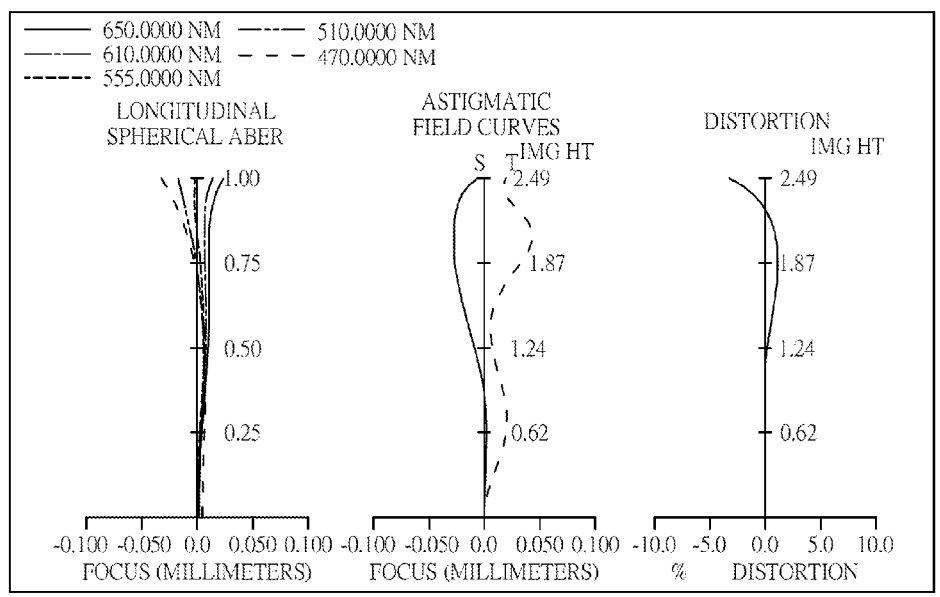
FIG. 6B is longitudinal spherical aberration curves, astigmatic field curves, and an optical distortion curve of the optical image capturing system in the order from left to right according to the sixth embodiment of the present application.
Figure 6C:
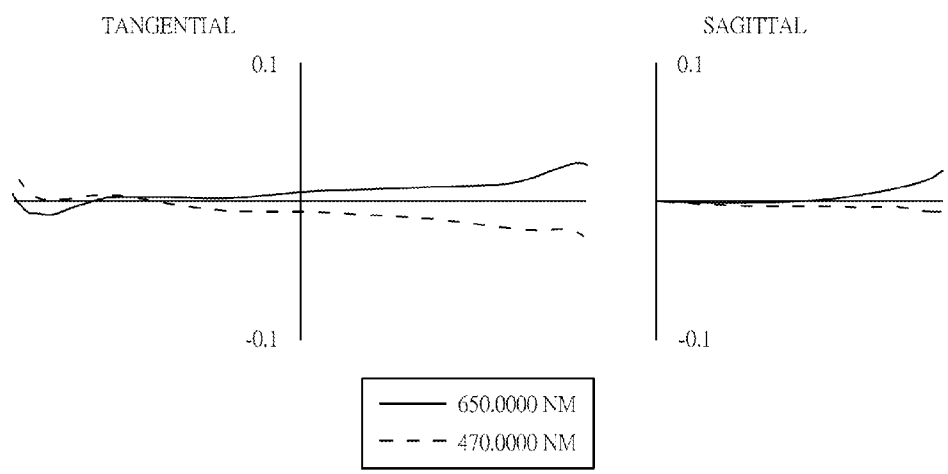
FIG. 6C is a transverse aberration diagram of the longest operation wavelength and the shortest operation wavelength for tangential fan and sagittal fan, wherein the longest operation wavelength and the shortest operation wavelength pass through an edge of the entrance pupil and incident at the position of 0.7 HOI on the image plane, according to the sixth embodiment of the present invention.

Please refer to FIG. 6A to FIG. 6C. FIG. 6A is a schematic view of the optical image capturing system according to the sixth embodiment of the present invention. FIG. 6B shows the longitudinal spherical aberration curves, astigmatic field curves, and an optical distortion curve of the optical image capturing system, in the order from left to right, according to the sixth embodiment of the present invention. FIG. 6C is a transverse aberration diagram of the longest operation wavelength and the shortest operation wavelength for tangential fan and sagittal fan, wherein the longest operation wavelength and the shortest operation wavelength pass through an edge of the aperture stop and incident at the position of 0.7 HOI on the image plane, according to the optical image capturing system of the sixth embodiment. As shown in FIG. 6A, in the order from an object side to an image side, the optical image capturing system includes a first lens element 610, an aperture stop 600, a second lens element 620, a third lens element 630, a fourth lens element 640, an IR-bandstop filter 670, an image plane 680, and an image sensing device 690.

The first lens element 610 has negative refractive power and it is made of plastic material. The first lens element 610 has a convex object-side surface 612 and a concave image-side surface 614, and both of the object-side surface 612 and the image-side surface 614 are aspheric.

The second lens element 620 has positive refractive power and it is made of plastic material. The second lens element 620 has a concave object-side surface 622 and a convex image-side surface 624, and both of the object-side surface 622 and the image-side surface 624 are aspheric. The object-side surface 622 has one inflection point.

The third lens element 630 has positive refractive power and it is made of plastic material. The third lens element 630 has a convex object-side surface 632 and a convex image-side surface 634, and both of the object-side surface 632 and the image-side surface 634 are aspheric. The image-side surface 634 has an inflection point.

The fourth lens element 640 has negative refractive power and it is made of plastic material. The fourth lens element 640 has a convex object-side surface 642 and a concave image-side surface 644, and both of the object-side surface 642 and the image-side surface 644 are aspheric, and each of them has two inflection points.

The IR-bandstop filter 670 is made of glass material. The IR-bandstop filter 670 is disposed between the fourth lens element 640 and the image plane 680 without affecting the focal length of the optical image capturing system.

Please refer to the following Table 11 and Table 12.

The detailed data of the optical image capturing system of the sixth Embodiment is as shown in Table 11.

TABLE 11

Lens Parameters for the Sixth Embodiment
f = 3.36741 mm; f/HEP = 1.2; HAF = 37.5011 deg

| Surface # | | Curvature Radius | Central Thickness | Material | Refractive Index | Abbe # | Focal length |
|---|---|---|---|---|---|---|---|
| 0 | Object | 1E+18 | 1E+13 | | | | |
| 1 | Lens 1 | 9.95863338 | 6.020 | Plastic | 1.661 | 20.40 | −7.106032 |
| 2 | | 2.434282258 | 0.728 | | | | |
| 3 | Ape. Stop | 1E+18 | 0.161 | | | | |
| 4 | Lens 2 | −7.728649238 | 2.654 | Plastic | 1.565 | 58.00 | 6.88 |
| 5 | | −2.914557811 | 0.050 | | | | |
| 6 | Lens 3 | 4.102591718 | 4.130 | Plastic | 1.565 | 58.00 | 3.22 |
| 7 | | −2.086869307 | 0.050 | | | | |
| 8 | Lens 4 | 44.45850299 | 1.236 | Plastic | 1.661 | 20.40 | −3.82 |
| 9 | | 2.380045645 | 0.450 | | | | |
| 10 | IR-bandstop filter | 1E+18 | 0.850 | BK_7 | 1.517 | 64.13 | 1E+18 |
| 11 | | 1E+18 | 0.252 | | | | |
| 12 | Image plane | 1E+18 | 0.002 | | | | |

Reference wavelength = 555 nm

As for the parameters of the aspheric surfaces of the sixth Embodiment, reference is made to Table 12.

TABLE 12

Aspheric Coefficients

| | Surface # | | | |
|---|---|---|---|---|
| | 1 | 2 | 4 | 5 |
| $k =$ | −3.502009E+00 | −2.427431E+00 | −5.000000E+01 | −2.331405E+00 |
| $A_4 =$ | 1.121387E−03 | 3.905670E−02 | −1.517579E−02 | −1.713765E−02 |
| $A_6 =$ | 1.514408E−05 | 2.621951E−02 | 5.586381E−03 | −7.094846E−04 |
| $A_8 =$ | −7.089904E−07 | −2.017899E−02 | −3.972550E−03 | 2.227212E−04 |
| $A_{10} =$ | 2.290982E−08 | 9.249652E−03 | 1.362984E−03 | −5.663162E−05 |
| $A_{12} =$ | 0.000000E+00 | 0.000000E+00 | 0.000000E+00 | 0.000000E+00 |

| | Surface # | | | |
|---|---|---|---|---|
| | 6 | 7 | 8 | 9 |
| $k =$ | −3.176700E+00 | −5.478225E+00 | −4.604642E+01 | −1.014863E+01 |
| $A_4 =$ | 1.067811E−03 | −3.357851E−03 | −1.012794E−02 | −1.870754E−02 |
| $A_6 =$ | 3.142067E−04 | 5.657456E−04 | −8.637325E−04 | 2.178348E−03 |
| $A_8 =$ | −4.901202E−05 | −6.632229E−05 | 2.215609E−04 | −1.297466E−04 |
| $A_{10} =$ | 1.915013E−06 | 2.970023E−06 | −8.559786E−06 | 4.809582E−06 |
| $A_{12} =$ | 0.000000E+00 | 0.000000E+00 | 0.000000E+00 | 0.000000E−00 |

In the sixth Embodiment, the presentation of the aspheric surface formula is similar to that in the first embodiment. Besides, the definitions of parameters in following tables are identical to those in the first embodiment, so the repetitious details will not be given here.

The following contents may be obtained from Table 11 and Table 12.

| Sixth embodiment (Primary reference wavelength: 555 nm) | | | | | |
|---|---|---|---|---|---|
| InRS41 | InRS42 | HVT41 | HVT42 | ODT % | TDT % |
| −0.40770 | 0.25417 | 0.72328 | 2.11034 | −3.25691 | 4.38911 |
| \|f/f1\| | \|f/f2\| | \|f/f3\| | \|f/f4\| | \|f1/f2\| | \|f2/f3\| |
| 0.47388 | 0.48925 | 1.04672 | 0.88243 | 1.03243 | 2.13944 |
| ΣPPR | ΣNPR | ΣPPR/\|ΣNPR\| | ΣPP | ΣNP | f1/ΣPP |
| 1.53596 | 1.35631 | 1.13246 | 10.09997 | −10.92210 | 0.68147 |
| f4/ΣNP | IN12/f | IN23/f | IN34/f | TP3/f | TP4/f |
| 0.65061 | 0.26389 | 0.01485 | 0.01485 | 1.22650 | 0.36693 |
| InTL | HOS | HOS/HOI | InS/HOS | InTL/HOS | ΣTP/InTL |
| 15.02820 | 16.58270 | 6.63308 | 0.59308 | 0.90626 | 0.93421 |
| (TP1 + IN12)/TP2 | (TP4 + IN34)/TP3 | TP1/TP2 | TP3/TP4 | IN23/(TP2 + IN23 + TP3) | |

-continued

| Sixth embodiment (Primary reference wavelength: 555 nm) | | | | | |
|---|---|---|---|---|---|
| 2.60283 | 0.31128 | 2.26802 | 3.34256 | 0.00732 | |
| \|InRS41\|/TP4 | \|InRS42\|/TP4 | HVT42/HOI | HVT42/HOS | | |
| 0.32995 | 0.20570 | 0.84414 | 0.12726 | | |
| PLTA | PSTA | NLTA | NSTA | SLTA | SSTA |
| −0.029 mm | 0.030 mm | 0.017 mm | 0.006 mm | −0.009 mm | 0.025 mm |
| OD | ID | OD/ID | OT | IT | OT/IT |
| 5.6 mm | 3.325 mm | 1.6842 | 0.3 mm | 0.15 mm | 2 |

The following contents may be obtained from Table 11 and Table 12.

| Values Related to Inflection Point of Sixth Embodiment (Primary Reference Wavelength = 555 nm) | | | | | | | |
|---|---|---|---|---|---|---|---|
| HIF211 | 1.2686 | HIF211/HOI | 0.5074 | SGI211 | −0.1105 | \|SGI211\|/(\|SGI211\| + TP2) | 0.0400 |
| HIF321 | 2.9431 | HIF321/HOI | 1.1772 | SGI321 | −1.1135 | \|SGI321\|/(\|SGI321\| + TP3) | 0.2124 |
| HIF411 | 0.4217 | HIF411/HOI | 0.1687 | SGI411 | 0.0017 | \|SGI411\|/(\|SGI411\| + TP4) | 0.0014 |
| HIF412 | 2.4163 | HIF412/HOI | 0.9665 | SGI412 | −0.2541 | \|SGI412\|/(\|SGI412\| + TP4) | 0.1706 |
| HIF421 | 0.8522 | HIF421/HOI | 0.3409 | SGI421 | 0.1143 | \|SGI421\|/(\|SGI421\| + TP4) | 0.0846 |
| HIF422 | 2.4364 | HIF422/HOI | 0.9745 | SGI422 | 0.2571 | \|SGI422\|/(\|SGI422\| + TP4) | 0.1722 |

The relevant data of the length of outline curve may be obtained from Table 11 and Table 12.

| Sixth Embodiment (Primary reference wavelength: 555 nm) | | | | | | |
|---|---|---|---|---|---|---|
| ARE | 1/2(HEP) | ARE value | ARE − 1/2(HEP) | 2(ARE/HEP) % | TP | ARE/TP (%) |
| 11 | 1.403 | 1.408 | 0.005 | 100.35% | 6.020 | 23.39% |
| 12 | 1.346 | 1.529 | 0.183 | 113.60% | 6.020 | 25.40% |
| 21 | 1.308 | 1.315 | 0.007 | 100.51% | 2.654 | 49.55% |
| 22 | 1.403 | 1.474 | 0.071 | 105.05% | 2.654 | 55.54% |
| 31 | 1.403 | 1.428 | 0.025 | 101.77% | 4.130 | 34.57% |
| 32 | 1.403 | 1.456 | 0.053 | 103.77% | 4.130 | 35.25% |
| 41 | 1.403 | 1.404 | 0.001 | 100.04% | 1.236 | 113.60% |
| 42 | 1.403 | 1.421 | 0.018 | 101.29% | 1.236 | 115.02% |
| ARS | EHD | ARS value | ARS − EHD | (ARS/EHD) % | TP | ARS/TP (%) |
| 11 | 5.518 | 6.508 | 0.990 | 117.93% | 6.020 | 108.11% |
| 12 | 1.346 | 1.529 | 0.183 | 113.60% | 6.020 | 25.40% |
| 21 | 1.308 | 1.315 | 0.007 | 100.51% | 2.654 | 49.55% |
| 22 | 2.357 | 2.997 | 0.640 | 127.16% | 2.654 | 112.90% |
| 31 | 3.592 | 3.903 | 0.312 | 108.68% | 4.130 | 94.51% |
| 32 | 3.512 | 3.810 | 0.298 | 108.48% | 4.130 | 92.25% |
| 41 | 3.215 | 3.265 | 0.050 | 101.55% | 1.236 | 264.23% |
| 42 | 2.825 | 2.845 | 0.020 | 100.71% | 1.236 | 230.23% |

The above-mentioned descriptions represent merely the exemplary embodiment of the present disclosure, without any intention to limit the scope of the present disclosure thereto. Various equivalent changes, alternations or modifications based on the claims of present disclosure are all consequently viewed as being embraced by the scope of the present disclosure.

What is claimed is:

1. An optical image capturing system, from an object side to an image side, comprising:
   a first lens element with refractive power;
   a second lens element with refractive power;
   a third lens element with refractive power;
   a fourth lens element with refractive power;
   an image plane; and
   a lens positioning element;
   wherein the lens positioning element is hollow in order to accommodate any lens elements and align the lens elements along an optical axis; the lens positioning element comprises an object-side end and an image-side end; the object-side end is adjacent to the object side and is disposed with a first opening; the image-side end is adjacent to the image side and is disposed with a second opening; an outer wall of the lens positioning element comprises at least two tangent planes, and each of the tangent planes is disposed with at least one sprue mark; the optical image capturing system comprises four lens elements with refractive powers; at least one lens element among the first to the fourth lens elements has positive refractive power; focal lengths of the first through the fourth lens elements are respectively f1, f2, f3 and f4; a focal length of the optical image capturing system is f, an entrance pupil diameter of the optical image capturing system is HEP, and a distance on the optical axis from the object-side surface of the first lens element to the image plane is HOS; a distance on the optical axis from the object-side surface of the first lens element to an image-side surface of the fourth lens element is InTL; half of a maximum angle of view of the optical image capturing system is HAF; an outline curve starting from an axial point on any surface of any one of the four lens elements, tracing along an outline of the surface, and ending at a coordinate point on the surface that has a vertical height of ½ entrance pupil diameter from the optical axis, has a length denoted by ARE; conditions as follows are satisfied: 1≤f/HEP≤10, 0 deg≤HAF≤150 deg, and 0.9≤2 (ARE/HEP)≤2.0.

2. The optical image capturing system of claim 1, wherein the outer wall of the lens positioning element comprises at least three tangent planes and each of the tangent planes has at least one sprue mark.

3. The optical image capturing system of claim 1, wherein an inner diameter of the first opening is OD, an inner diameter of the second opening is ID, and the following conditions are satisfied: 0.1≤OD/ID≤10.

4. The optical image capturing system of claim 1, wherein a minimum thickness of the object-side end is OT and a minimum thickness of the image-side end is IT, and the following condition is satisfied: 0.1≤OT/IT≤10.

5. The optical image capturing system of claim 1, wherein TV distortion for image formation in the optical image capturing system is TDT; the optical image capturing system has a maximum image height HOI on the image plane perpendicular to the optical axis, a transverse aberration of the longest operation wavelength of a positive direction tangential fan of the optical image capturing system passing through an edge of the entrance pupil and incident at a position of 0.7 HOI on the image plane is denoted by PLTA, and a transverse aberration of the shortest operation wavelength of the positive direction tangential fan of the optical image capturing system passing through the edge of the entrance pupil and incident at the position of 0.7 HOI on the image plane is denoted by PSTA; a transverse aberration of the longest operation wavelength of a negative direction tangential fan of the optical image capturing system passing through the edge of the entrance pupil and incident at the position of 0.7 HOI on the image plane is denoted by NLTA, and a transverse aberration of the shortest operation wavelength of a negative direction tangential fan of the optical image capturing system passing through the edge of the entrance pupil and incident at the position of 0.7 HOI on the image plane is denoted by NSTA; a transverse aberration of the longest operation wavelength of a sagittal fan of the optical image capturing system passing through the edge of the entrance pupil and incident at the position of 0.7 HOI on the image plane is denoted by SLTA, a transverse aberration of the shortest operation wavelength of the sagittal fan of the optical image capturing system passing through the edge of the entrance pupil and incident at the position of 0.7 HOI on the image plane is denoted by SSTA; conditions as follows are satisfied: PLTA≤100 µm; PSTA≤100 µm; NLTA≤100 µm; NSTA≤100 µm; SLTA≤100 nm; and SSTA≤100 µm; and |TDT|<100%.

6. The optical image capturing system of claim 1, wherein the image plane is a plane or a curved surface.

7. The optical image capturing system of claim 1, wherein an outline curve starting from an axial point on an object-side surface of the fourth lens elements, tracing along an outline of the object-side surface, and ending at a coordinate point on the surface that has a vertical height of ½ entrance pupil diameter from the optical axis, has a length denoted by ARE41; an outline curve starting from an axial point on an image-side surface of the fourth lens elements, tracing along an outline of the image-side surface, and ending at a coordinate point on the surface that has a vertical height of ½ entrance pupil diameter from the optical axis, has a length denoted by ARE42; a central thickness of the fourth lens element on the optical axis is TP4, which satisfies conditions as follows: 0.05≤ARE41/TP4≤25 and 0.05≤ARE42/TP4≤25.

8. The optical image capturing system of claim 1, wherein an outline curve starting from an axial point on an object-side surface of the third lens elements, tracing along an outline of the object-side surface, and ending at a coordinate point on the surface that has a vertical height of ½ entrance pupil diameter from the optical axis, has a length denoted by ARE31; an outline curve starting from an axial point on an image-side surface of the third lens elements, tracing along an outline of the image-side surface, and ending at a coordinate point on the surface that has a vertical height of ½ entrance pupil diameter from the optical axis, has a length denoted by ARE32; a central thickness of the third lens element on the optical axis is TP3, which satisfies conditions as follows: 0.05≤ARE31/TP3≤25 and 0.05≤ARE32/TP3≤25.

9. The optical image capturing system of claim 1, further comprising an aperture stop; wherein a distance from the aperture stop to the image plane on the optical axis is InS, which satisfies condition as follows: 0.2≤InS/HOS≤1.1.

10. An optical image capturing system, from an object side to an image side, comprising:
a first lens element with refractive power;
a second lens element with refractive power;
a third lens element with refractive power;
a fourth lens element with refractive power;
an image plane; and
a lens positioning element,
wherein the lens positioning element is hollow to accommodate any lens elements and align the lens elements along an optical axis; the lens positioning element comprises an object-side end and an image-side end; the object-side end is adjacent to the object side and is disposed with a first opening, and the image-side end is adjacent to the image side and is disposed with a second opening; an outer wall of the lens positioning element comprises at two tangent planes, and each of the tangent planes has at least one sprue mark; the optical image capturing system comprises four lens elements with refractive powers; at least one surface of at least one lens element among the first to the fourth lens elements has at least one inflection point; at least one lens element among the second to the fourth lens elements has positive refractive power; focal lengths of the first through the fourth lens elements are respectively f1, f2, f3 and f4; a focal length of the optical image capturing system is f, an entrance pupil diameter of the optical image capturing system is HEP, and a distance on the optical axis from the object-side surface of the first lens element to the image plane is HOS; a distance on the optical axis from the object-side surface of the first lens element to an image-side surface of the fourth lens element is InTL; half of a maximum angle of view of the optical image capturing system is HAF; an outline curve starting from an axial point on any surface of any one of the four lens elements, tracing along an outline of the surface, and ending at a coordinate point on the surface that has a vertical height of ½ entrance pupil diameter from the optical axis, has a length denoted by ARE; conditions as follows are satisfied: 1≤f/HEP≤10, 0 deg≤HAF≤150 deg, and 0.9≤2 (ARE/HEP)≤2.0.

11. The optical image capturing system of claim 10, wherein the outer wall of the lens positioning element comprises at least three tangent planes, each of the tangent planes has at least one sprue mark.

12. The optical image capturing system of claim 10, wherein an inner diameter of the first opening is OD, an inner diameter of the second opening is ID, and the following conditions are satisfied: 0.1≤OD/ID≤10.

13. The optical image capturing system of claim 10, wherein a minimum thickness of the object-side end is OT and a minimum thickness of the image-side end is IT, and the following condition is satisfied: 0.1≤OT/IT≤10.

14. The optical image capturing system of claim 10, wherein a maximum effective half diameter of any surface of any one of the four lens elements is denoted by EHD; an outline curve starting from an axial point on any surface of any one of those lens elements, tracing along an outline of the surface, and ending at a point which defines the maximum effective half diameter, has a length denoted by ARS; conditions as follows are satisfied: 0.9≤ARS/EHD≤2.0.

15. The optical image capturing system of claim 10, wherein the optical image capturing system has a maximum image height HOI on the image plane perpendicular to the optical axis; a transverse aberration of the longest operation wavelength of a positive direction tangential fan of the optical image capturing system passing through an edge of the entrance pupil and incident at a position of 0.7 HOI on the image plane is denoted by PLTA, and a transverse aberration of the shortest operation wavelength of the positive direction tangential fan of the optical image capturing system passing through the edge of the entrance pupil and incident at the position of 0.7 HOI on the image plane is denoted by PSTA; a transverse aberration of the longest operation wavelength of a negative direction tangential fan of the optical image capturing system passing through the edge of the entrance pupil and incident at the position of 0.7 HOI on the image plane is denoted by NLTA, and a transverse aberration of the shortest operation wavelength of a negative direction tangential fan of the optical image capturing system passing through the edge of the entrance pupil and incident at the position of 0.7 HOI on the image plane is denoted by NSTA; a transverse aberration of the longest operation wavelength of a sagittal fan of the optical image capturing system passing through the edge of the entrance pupil and incident at the position of 0.7 HOI on the image plane is denoted by SLTA, a transverse aberration of the shortest operation wavelength of the sagittal fan of the optical image capturing system passing through the edge of the entrance pupil and incident at the position of 0.7 HOI on the image plane is denoted by SSTA; conditions as follows are satisfied: PLTA≤50 μm; PSTA≤50 μm; NLTA≤50 μm; NSTA≤50 μm; SLTA≤50 μm; and SSTA≤50 μm.

16. The optical image capturing system of claim 10, wherein a distance between the first lens element and the second lens element on the optical axis is IN12, and the following condition is satisfied: 0<IN12/f≤60.

17. The optical image capturing system of claim 10, wherein a distance between the third lens element and the fourth lens element on the optical axis is IN34, a central thickness of the third lens element and a central thickness of the fourth lens element on the optical axis respectively are TP3 and TP4, and the following condition is satisfied: 1≤(TP4+IN34)/TP3≤10.

18. The optical image capturing system of claim 10, wherein the distance from the first lens element to the second lens element on the optical axis is IN12, a central thickness of the first lens element and a central thickness of the second lens element on the optical axis respectively are TP1 and TP2, and the following condition is satisfied: 1≤(TP1+IN12)/TP2≤10.

19. The optical image capturing system of claim 10, wherein at least one lens element among the first lens element, the second lens element, the third lens element and the fourth lens element is a filter element of light with wavelength of less than 500 nm.

20. An optical image capturing system, from an object side to an image side, comprising:
a first lens element with refractive power;
a second lens element with refractive power;
a third lens element with refractive power;
a fourth lens element with refractive power;
an image plane; and
a lens positioning element,
wherein the lens positioning element is hollow to accommodate any lens elements and align the lens elements along the optical axis; the lens positioning element comprises an object-side end and an image-side end; the object-side end is adjacent to the object side and is disposed with a first opening, and the image-side end is adjacent to the image side and is disposed with a second opening; an outer wall of the lens positioning element comprises at least three tangent planes, and each of the tangent planes has at least one sprue mark; the optical image capturing system comprises four lens elements with refractive powers; focal lengths of the first through the fourth lens elements are respectively f1, f2, f3 and f4; a focal length of the optical image capturing system is f, an entrance pupil diameter of the optical image capturing system is HEP, and a distance on the optical axis from the object-side surface of the first lens element to the image plane is HOS; a distance on the optical axis from the object-side surface of the first lens element to an image-side surface of the fourth lens element is InTL; half of a maximum angle of view of the optical image capturing system is HAF; an outline curve starting from an axial point on any surface of any one of the four lens elements, tracing along an outline of the surface, and ending at a coordinate point on the surface that has a vertical height of ½ entrance pupil diameter from the optical axis, has a length denoted by ARE; conditions as follows are satisfied: 1≤f/HEP≤10, 0 deg≤HAF≤150 deg, and 0.9≤2 (ARE/HEP)≤2.0.

21. The optical image capturing system of claim 20, wherein an inner diameter of the first opening is OD, an inner diameter of the second opening is ID, and the following condition is satisfied: 0.1≤OD/ID≤10.

22. The optical image capturing system of claim 20, wherein a minimum thickness of the object-side end is OT, a minimum thickness of the image-side end is IT, and the following condition is satisfied: 1≤OT/IT≤10.

23. The optical image capturing system of claim 20, wherein an outline curve starting from an axial point on an object-side surface of the fourth lens elements, tracing along an outline of the object-side surface, and ending at a coordinate point on the surface that has a vertical height of ½ entrance pupil diameter from the optical axis, has a length denoted by ARE41; an outline curve starting from an axial point on an image-side surface of the fourth lens elements, tracing along an outline of the image-side surface, and ending at a coordinate point on the surface that has a vertical height of ½ entrance pupil diameter from the optical axis, has a length denoted by ARE42; a central thickness of the fourth lens element on the optical axis is TP4, which satisfies conditions as follows: 0.05≤ARE41/TP4≤25 and 0.05≤ARE42/TP4≤25.

24. The optical image capturing system of claim 20, wherein an outline curve starting from an axial point on an object-side surface of the third lens elements, tracing along an outline of the object-side surface, and ending at a coordinate point on the surface that has a vertical height of ½ entrance pupil diameter from the optical axis, has a length denoted by ARE31; an outline curve starting from an axial point on an image-side surface of the third lens elements, tracing along an outline of the image-side surface, and ending at a coordinate point on the surface that has a vertical height of ½ entrance pupil diameter from the optical axis, has a length denoted by ARE32; a central thickness of the third lens element on the optical axis is TP3, which satisfies conditions as follows: 0.05≤ARE31/TP3≤25 and 0.05≤ARE32/TP3≤25.

25. The optical image capturing system of claim 20, further comprising an aperture stop, an image sensing device and a driving module, wherein the image sensing device is disposed on the image plane, a distance on the optical axis from the aperture stop to the image plane is InS, and the driving module couples with the lens elements to displace the lens elements; the following condition is satisfied: $0.2 \leq InS/HOS \leq 1.1$.

* * * * *